United States Patent
Hoy

(10) Patent No.: US 8,725,402 B2
(45) Date of Patent: May 13, 2014

(54) LOSS OF SEPARATION AVOIDANCE MANEUVERING

(75) Inventor: Patrick D. Hoy, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 12/968,152

(22) Filed: Dec. 14, 2010

(65) Prior Publication Data

US 2011/0288773 A1 Nov. 24, 2011

Related U.S. Application Data

(63) Continuation-in-part of application No. 12/617,822, filed on Nov. 13, 2009.

(51) Int. Cl.
*G06F 17/10* (2006.01)
*G08B 21/00* (2006.01)

(52) U.S. Cl.
USPC .......................................... 701/301; 340/945

(58) Field of Classification Search
USPC ............. 701/2, 3, 4, 7, 9, 408, 411, 413, 422,
701/484, 497, 500, 501, 5, 6, 8, 11, 12, 14,
701/15, 16, 17, 18, 468, 528, 529, 539, 10,
701/24, 25, 26, 27, 38, 301; 244/3.19, 3.15,
244/17.17, 185, 186, 220, 90 R, 23 A, 23 B,
244/36, 211, 214, 215, 56, 179, 180, 181,
244/80, 90 A; 455/563, 431; 340/945, 961,
340/971, 901–903, 963, 967, 979–982
See application file for complete search history.

(56) References Cited

U.S. PATENT DOCUMENTS

| 5,058,024 | A | 10/1991 | Inselberg |
| 5,173,861 | A | 12/1992 | Inselberg et al. |
| 5,555,175 | A | 9/1996 | D'orso |
| 6,173,219 | B1 | 1/2001 | Deker |
| 6,405,124 | B1 | 6/2002 | Hutton |
| 6,480,789 | B2 * | 11/2002 | Lin ............................... 701/301 |
| 6,546,338 | B2 | 4/2003 | Sainthuile et al. |

(Continued)

FOREIGN PATENT DOCUMENTS

| EP | 1936584 A1 | 6/2008 |
| WO | 2009045664 A2 | 4/2009 |

OTHER PUBLICATIONS

Extended European Search Report, EP Application No. 11192950.1-2215, Reference: NAM/P119923EP00, Apr. 16, 2012, (8 pgs).

(Continued)

*Primary Examiner* — Muhammad Shafi
(74) *Attorney, Agent, or Firm* — Toler Law Group, PC

(57) ABSTRACT

A flight management system for an aircraft may determine maneuvers to avoid loss of separation between the aircraft and another aircraft. The flight management system may include a processor and a memory accessible to the processor. The memory may store instructions that are executable by the processor to identify a potential loss of separation between the aircraft and a second aircraft. The instructions may also be executable by the processor to determine whether executing a first speed maneuver using predetermined parameters is predicted to avoid the potential LOS. The instructions may be further executable by the processor to determine parameters of a second speed maneuver when the first speed maneuver is expected to avoid the potential LOS.

18 Claims, 11 Drawing Sheets

(56) References Cited

U.S. PATENT DOCUMENTS

| | | | |
|---|---|---|---|
| 6,571,176 B1 | 5/2003 | Shinmura et al. | |
| 6,718,236 B1 * | 4/2004 | Hammer et al. | 701/3 |
| 6,804,607 B1 | 10/2004 | Wood | |
| 6,819,982 B2 | 11/2004 | Doane | |
| 6,960,750 B2 | 11/2005 | Doane | |
| 7,389,163 B1 | 6/2008 | Colich | |
| 7,788,314 B2 | 8/2010 | Holt | |
| 2003/0014165 A1 | 1/2003 | Baker et al. | |
| 2003/0160708 A1 | 8/2003 | Knoop | |
| 2005/0055143 A1 * | 3/2005 | Doane | 701/30 |
| 2006/0109166 A1 | 5/2006 | Arthur et al. | |
| 2007/0078600 A1 * | 4/2007 | Fregene et al. | 701/301 |
| 2008/0027647 A1 | 1/2008 | Ansell et al. | |
| 2008/0103639 A1 | 5/2008 | Troy et al. | |
| 2009/0088972 A1 * | 4/2009 | Bushnell | 701/210 |
| 2009/0143951 A1 | 6/2009 | Takahashi et al. | |
| 2010/0039310 A1 | 2/2010 | Smith et al. | |
| 2010/0286900 A1 | 11/2010 | Depape et al. | |
| 2010/0292912 A1 * | 11/2010 | Palanichamy et al. | 701/120 |
| 2011/0118980 A1 | 5/2011 | Hoy | |

OTHER PUBLICATIONS

U.K Intellectual Property Office, Combined Search and Examination Report, Application No. GB1018034.7, Feb. 24, 2011, 8 pages.

Utt, J. et al., "Development of a Sense and Avoid System", AIAA 2005-7177, Sep. 2005, American Institute of Aeronautics and Astronautics, Reston Virginia, pp. 1-8.

* cited by examiner

LOSS OF SEPARATION AVOIDANCE MANEUVERING

CLAIM OF PRIORITY

This application is a continuation in part of and claims priority from U.S. patent application Ser. No. 12/617,822, filed on Nov. 13, 2009, which is incorporated herein by reference in its entirety.

FIELD OF THE DISCLOSURE

The present disclosure is generally related to systems and methods to perform maneuvers to avoid loss of separation between aircraft.

BACKGROUND

Loss of separation between aircraft can occur whenever specified separation requirements between the aircraft are breached. Minimum separation standards for airspace are specified by Air Traffic Services (ATS) authorities, based on FAA (Federal Aviation Administration) standards.

When a potential loss of separation (LOS) is detected, the LOS may be addressed by human intervention. For example, a traffic controller may predict the loss of separation and may provide instruction to one or more of the vehicles to avoid the LOS. However, neither a traffic controller nor a remote pilot can enable an on-board capability to avoid other aircraft when a data link of an unmanned aerial vehicle fails.

In another example, a Traffic Alert and Collision Avoidance System (TCAS) may predict an unsafe separation and may generate either an alert or an avoidance instruction to a vehicle controller to change altitude. Air traffic rules indicate that unmanned systems disallow altitude changes for separation of unmanned aircraft. For example, FAA CFR 91.113 (b) states: "When a rule of this section gives another aircraft the right-of-way, the pilot shall give way to that aircraft and may not pass over, under, or ahead of it unless well clear."

SUMMARY

Systems and methods disclosed herein may provide loss of separation avoidance capability on-board an aircraft. For example, a control system, such as a sense and avoid system, may be integrated into the aircraft. The control system may identify a potential loss of separation condition and may perform maneuvers to avoid the loss of separation. The control system may perform an initial test using predetermined parameters to determine whether a maneuver of a particular type can be performed to avoid the potential loss of separation. After determining that a maneuver of the particular type may be able to avoid the loss of separation, the control system may attempt to find a less severe maneuver of the particular type that also avoids the loss of separation. Such control systems may enable unmanned aerial vehicles to fly in national airspace without violating flight safety rules regarding loss of separation.

A particular embodiment includes a flight control system for an aircraft. The flight control system may include a processor and a memory accessible to the processor. The memory may store instructions that are executable by the processor to identify a potential loss of separation (LOS) between the aircraft and a second aircraft. The instructions may be further executable by the processor to determine whether executing a first speed maneuver using predetermined parameters is predicted to avoid the potential LOS. The instructions may be further executable by the processor to determine parameters of a second speed maneuver when the first speed maneuver is predicted to avoid the potential LOS.

In a particular embodiment, a method may include automatically identifying, on board a first aircraft, a potential loss of separation (LOS) between the first aircraft and a second aircraft. The method may also include determining parameters of a speed maneuver to avoid the potential LOS. The method may further include executing the speed maneuver in accordance with the parameters.

In a particular embodiment, an aircraft may include a sense-and-avoid system that causes the aircraft to perform a maneuver in response to a potential loss of separation (LOS) between the aircraft and a second aircraft. The sense-and-avoid system may perform the maneuver by determining whether executing a first speed maneuver using predetermined parameters avoids the potential LOS. When executing the first speed maneuver would avoid the LOS, the sense-and-avoid system may determine parameters for a second speed maneuver to avoid the potential LOS. The second speed maneuver may be executed in accordance with the determined parameters.

The features, functions, and advantages that have been described can be achieved independently in various embodiments or may be combined in yet other embodiments, further details of which are disclosed with reference to the following description and drawings.

DETAILED DESCRIPTION

Figure 1:
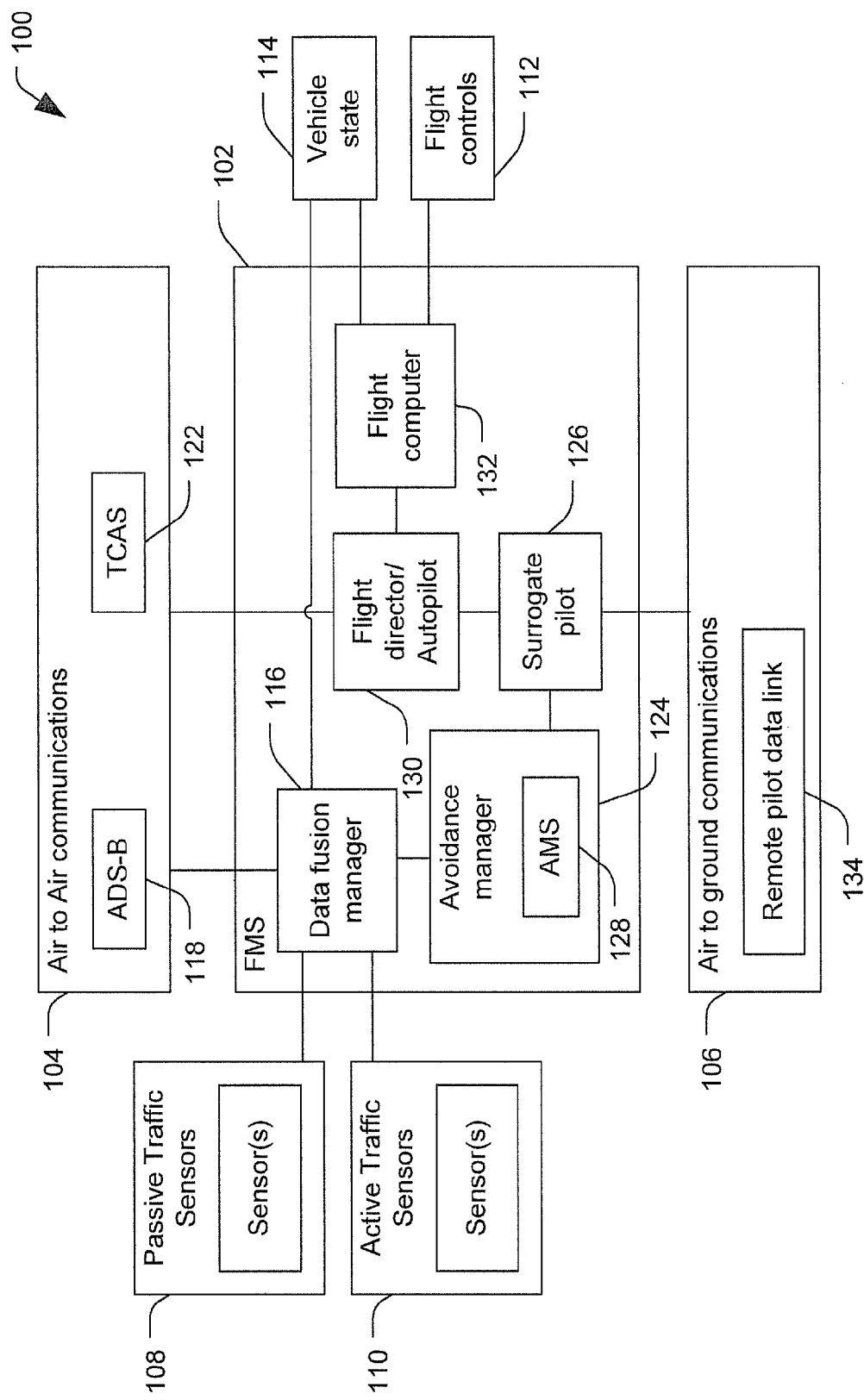
FIG. 1 is a block diagram of an aircraft that includes an avoidance maneuvering system.

To avoid a loss of separation, many variables may be considered, such as variables descriptive of a trajectory of each aircraft (e.g., heading, speed, altitude, etc.). It may be desirable to avoid the loss of separation in a timely and efficient manner (i.e., in a manner that allows both aircraft to reach their destinations as near as possible to an expected arrival time and without either aircraft expending excessive fuel or performing unneeded maneuvers). When efficiency and timeliness are considered, avoiding the loss of separation can be an even more complex, multivariable problem. Embodiments disclosed herein decompose this complex, multivariable problem into a more efficient series of single variable problems. For example, the problem may be modeled as one or more standard zero finding problems and the "false position" method (Regula Falsi method) may be used to solve sub-problems. Decomposing the problem as disclosed herein may provide superior processing times and may be well suited for real-time processing on-board an aircraft.

Particular embodiments disclosed herein may avoid loss of separation conditions without performing unnecessary nuisance maneuvers. For example, to determine whether a loss of separation will occur at a future point in time, a prediction may be made of where each aircraft will be at the future point in time. Predicting where a first aircraft that is under known control (e.g., the aircraft onboard which the loss of separation determination is made, also referred to herein as an "ownship") will be at the future point in time may be subject to uncertainty. For example, external conditions, such as weather (e.g., variable cross-winds or turbulence) may provide some uncertainty to the prediction. Predicting where an aircraft that is under unknown or independent control (also referred to herein as an "intruder") will be at the future point in time may be subject to even more uncertainty. For example, the intruder's path may be subject to change at the discretion of a pilot, whose intentions may be unknown. Additionally, it may be undesirable for the ownship to execute unneeded maneuvers. For example, executing unneeded maneuvers may be considered a nuisance to a remote pilot, may waste fuel, may cause delays, and may cause safety issues since the maneuvers may cause the ownship to behave in a seemingly erratic or unpredictable manner. To reduce the likelihood or frequency of executing unnecessary maneuvers, maneuvers may be executed as close as possible to the time when the loss of separation is predicted to occur. Postponing execution of the maneuvers in this manner may allow some uncertainty in the prediction to be resolved so that the maneuver can be avoided or modified.

Particular embodiments include a speed reduction maneuvering system. The speed reduction maneuvering system may avoid loss of separation by changing a speed of the ownship. In a particular embodiment, the speed reduction maneuvering system may supplement rather than replace other avoidance maneuver generation systems, such as a TCAS or a lateral maneuvering system. For example, the speed reduction maneuvering system may be integrated with or coupled to the other avoidance maneuver generation systems. To illustrate, the speed reduction maneuvering system may be coupled to other sense and avoid systems, which may compete to provide suitable avoidance maneuvers for different situations. The TCAS may use altitude changes to provide separation. The lateral maneuvering system may use directional changes to provide separation. The speed reduction maneuver system provides separation using speed changes. In some situations a speed maneuver may not be sufficient to avoid a loss of separation, in which case the TCAS system may provide a change of altitude maneuver to avoid the loss of separation, or the lateral maneuvering system may provide a directional change to avoid the loss of separation.

The lateral maneuvering system may utilize a wind vector to create inertial referenced turns rather than ground reference turns. Using inertial referenced turns can improve a flight controller's ability to follow a commanded route or trajectory. For example, a ground reference turn may be executed by varying a bank angle to follow a desired ground track. Depending on the winds and the turn radius, the bank angle may be outside the performance capabilities of the aircraft. Thus, the aircraft may not be able to follow the ground reference turn which may lead to a loss of separation.

The following terms are used herein. These terms are not intended to be a limitation, but are used merely to simplify the description of the disclosed systems and methods of avoiding a loss of separation:

Ownship—refers to a vehicle (e.g., an aircraft) that is to perform a maneuver to avoid a loss of separation. That is, the Ownship is the vehicle that is giving the right-of-way to a second vehicle. In particular embodiments, the Ownship may host an onboard system to avoid a loss of separation, enabling automated loss of separation avoidance onboard the Ownship.

Intruder—refers to the vehicle that the Ownship is avoiding.

Conflict—refers to a predicted loss of separation (LOS) between the Ownship and the Intruder based on a desired miss distance, S.

Separation region—refers to a circular region having a radius that is one half of the desired miss distance S.

CPA (Closest Point of Approach)—refers to a location where a distance between the Ownship and the Intruder is at its minimum. The CPA may be specified as a place, a distance, a time, or any combination thereof. The CPA may occur after a loss of separation.

Resolution—refers to a maneuver that, if executed, will cause the desired miss distance to be maintained.

Maneuver Start Time (or diverge time)—refers to a point in time at which the maneuver is to begin execution to implement the resolution. To illustrate, a vehicle does not change its current intent (i.e., does not diverge) until it starts to execute the resolution. The time at which the resolution begins execution is the maneuver start time.

Unnecessary Maneuver—refers to a maneuver that is executed by the Ownship (i.e., a deviation from an assigned speed or path of the Ownship) that is not required to avoid a loss of separation (e.g., when the loss of separation could have been avoided without the deviation).

The equations disclosed hereinafter use a two-dimensional Cartesian coordinate system, which will be a local tangent plane common to both the Ownship and the Intruder. It is assumed that trajectories of the Ownship and the Intruder are projected onto a common coordinate system for the period when there is not enough vertical separation. The FAA right-of-way rules include special instructions when a vehicle is descending or ascending, and a higher level function in the sense and avoid system may determine when a process to comply with the descent and ascent rules should be invoked. Accordingly, although altitude changes may be used in some embodiments (e.g., embodiments that include a TCAS), determining altitude change maneuvers is not described in detail.

FIG. 1 is a block diagram of an aircraft 100 that includes an avoidance maneuvering system 128. In a particular embodiment, the aircraft 100 may be an unmanned aerial vehicle (UAV). The avoidance maneuvering system (AMS) 128 may include a speed avoidance maneuvering system, a lateral avoidance maneuvering system, both.

The aircraft 100 may also include a flight management system (FMS) 102. The FMS 102 may receive information via air-to-air communications system 104, air-to-ground communications system 106, passive traffic sensors 108 (e.g., cameras or optical sensors), active traffic sensors 110 (e.g., radar), or any combination thereof. The air-to-air communications system 104 may include an Automatic Dependent Surveillance—Broadcast (ADS-B) system 118. The ADS-B 118 may periodically or occasionally broadcast the aircraft's position and perhaps other information to ground stations or to other aircraft. The air-to-air communications system 104 may also include a Traffic Alert and Collision Avoidance System (TCAS) 122. The TCAS 122 may predict an unsafe separation and may generate either an alert or an avoidance instruction to change an altitude of the aircraft 100.

The FMS 102 may receive information concerning a state of the aircraft 100 as vehicle state data 114. The vehicle state data 114 may include information such as a position of the aircraft 100, a speed of the aircraft 100, a heading or course of the aircraft 100, an altitude of the aircraft 100, information about systems onboard the aircraft 100, or any combination thereof. The FMS 102 may use information received from the air-to-air communications system 104, the passive traffic sensors 108, the active traffic sensors 110, the air-to-ground communications system 106, the vehicle state data 114, or any combination thereof, to determine commands to send to flight controls 112 of the aircraft 100. For example, when the FMS 102 detects a potential loss of separation, the FMS 102 may determine commands to execute an avoidance maneuver (e.g., a speed avoidance maneuver or a lateral avoidance maneuver) and may send the commands to the flight controls 112.

The FMS 102 may include a data fusion manager 116. The data fusion manager 116 may receive the vehicle state data 114, data from the sensors 108 and 110, and data from the air-to-air communications system 104. The data fusion manager 116 may process the data to generate a set of data corresponding to the aircraft 100 and a set of data corresponding to an Intruder. That is, the data fusion manager 116 may output a first set of state data representing a state of the Ownship and a second set of state data representing a state of the Intruder. The first and second sets of state data may be provided to an avoidance manager 124.

The avoidance manager 124 may process the state data to identify a potential loss of separation. When a potential loss of separation is identified, the avoidance manager 124 may use the AMS 128 to determine a maneuver that can be executed to avoid the loss of separation. When a time to execute the maneuver arrives, the avoidance manager 124 may send an avoidance command to a surrogate pilot 126. In a particular embodiment, the avoidance manager 124 is a computer system that executes software to implement the AMS 128. In another particular embodiment, the avoidance manager 124 includes circuitry or other hardware, such as application specific integrated circuits, adapted to implement the AMS 128.

The AMS 128 may include a lateral avoidance maneuvering system (LAMS), a speed avoidance maneuvering system (SAMS), or both. The AMS 128 may be operable in at least two modes. For example, in a first mode, the avoidance command may be sent from the AMS 128 through the surrogate pilot 126 to a flight director/autopilot 130. The flight director/autopilot 130 may issue instructions to a flight computer 132 to cause the aircraft 100 to perform a maneuver that avoids the loss of separation. Thus, in the first mode, the aircraft 100 may automatically (i.e., without human intervention) perform a maneuver to avoid a predicted loss of separation.

In a second mode, the AMS 128 may send a message to advise a remote pilot (e.g., a pilot on the ground who is flying the vehicle by remote control) that a maneuver is to be implemented. The remote pilot may be able to accept or reject the maneuver. In the second mode, the AMS 128 may send maneuver information to the surrogate pilot 126. The surrogate pilot 126 may send the maneuver information to the remote pilot via a remote pilot data link 134 of the air-to-ground communications system 106. The surrogate pilot 126 may then receive a message indicating acceptance or rejection of the maneuver from the remote pilot via the remote pilot data link 134. If the remote pilot accepts the maneuver, the maneuver information may be forwarded to the flight director/autopilot 130 for execution. If the remote pilot rejects the maneuver, the maneuver information may not be forwarded to the flight director/autopilot 130. If no message indicating acceptance or rejection of the maneuver is received, the maneuver information may be sent to the flight director/autopilot 130 for execution or another attempt may be made to send the maneuver information to the remote pilot. Thus, in the second mode, the aircraft 100 may automatically perform a maneuver to avoid a predicted loss of separation when the maneuver is not rejected by the remote pilot. That is, the maneuver may be automatically executed when a human does not intervene to override the maneuver. In a particular embodiment, the AMS 128 enables the aircraft 100, which may be a UAV, to avoid a loss of separation with one or more other aircraft.

Lateral Maneuvering

Figure 2:
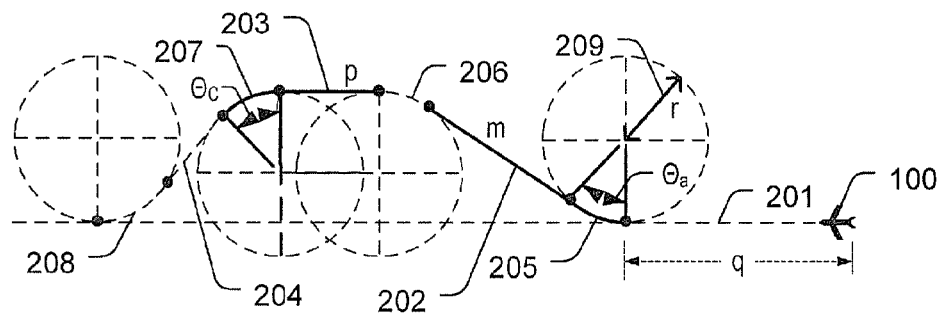
FIG. 2 is a diagram showing the control variables of a lateral maneuver model in a particular embodiment.

Referring to FIG. 2, a lateral maneuver model for the aircraft 100 is shown. The lateral maneuver model of FIG. 2 illustrates calculations that may be performed by the AMS 128 of FIG. 1 to determine a lateral maneuver to avoid a loss of separation. The lateral maneuver model of FIG. 2 includes seven segments connected by eight points. For example, the segments include four arcs or turns 205-208 and three straight legs 202-204. Each arc may use the same turn radius. For example, the turn radius may be determined based on a desired bank angle and the airspeed of the aircraft 100. The turn radius 209, r, may be calculated as $r = V^2/(g * \tan(\Phi))$, where r=turn radius 209 in meters; V=airspeed in meters/second; g=gravity in meters/second$^2$; $\Phi$=desired bank angle in radians; and the symbol * represents multiplication.

A set of control variables may be used to generate, or define, the lateral maneuver. For example, the control variables for the lateral maneuver may include [$\theta_a$, $\theta_c$, m, p, q, d], where $\theta_a$ is a duration or angular value (e.g., in radians or degrees) for a first turn 205 and a second turn 206; $\theta_c$ is a duration or angular value for a third turn 207 and a fourth turn 208; m is an inertial length of a first leg 202 (e.g., in meters); p is an inertial length of a second leg 203 (e.g., in meters); q is a diverge time (e.g., in seconds) from an initial position; and d or $d_{bank}$ is an initial bank direction (e.g., left or right).

In a particular embodiment, the first and second turns 205, 206 are of the same duration so that the second leg 203 is parallel to an original path or vector 201. Additionally, the third and fourth turns may be of the same duration. A last leg 204 may be a dependent value that is set such that the maneuver intersects the original vector 201. That is, a length of the last leg 204 may be selected such that, after the fourth turn 208 is executed, the aircraft 100 is flying along the original path 201 again.

The ranges for the control variables may be established such that only forward motion occurs. A start time may be limited to a predicted time of the loss of separation. Other limits for the control variables or other parameters may be configurable. In a particular embodiment, the following limits may be imposed on the control variables: $\theta_a$ may have a range of [0, 90] degrees ground course change; $\theta_c$ may have a range of [0, 90] degrees ground course change; in may have a range of [0, M] meters, where M is a configurable maximum off-path distance (i.e., a maximum lateral distance between the original path 201 and the second leg 203); p may have a range of [0, P] meters, where P is a configurable maximum passing distance; q may have a range of [0, L] seconds, where L is the time of loss of separation; and $d_{bank}$ may have a value of −1 or +1 (where −1 corresponds to a bank left and +1 corresponds to a bank right). The bank direction $d_{bank}$ may be predetermined and removed as a control variable, which may facilitate adhering to some of FAA right-of-way rules. For example, the bank direction $d_{bank}$ may be predetermined to only allow right turns.

The control variables [$\theta_a$, $\theta_c$, m, p, q, $d_{bank}$] may be used to generate a trajectory defining the lateral maneuver shown in FIG. 2. For example, standard equations of motion may be used. To simplify the present disclosure, detailed calculations to determine the trajectory are provided in a Trajectory Calculation section below. A summary of the equations that may be used to calculate the trajectory (given the control variables and an initial position P of the aircraft 100; a wind vector $\overline{W}$; an inertial speed s; an inertial course i; and a turn radius r) is provided in TABLE 1. Radians may be used to perform the calculations in TABLE 1; however, degrees are shown for the reader's convenience. Sign differences in the turn center calculations in TABLE 1 correspond to first turning right, turning left twice, and turning right again (i.e., the turns 205-208 of FIG. 2). These calculations would have different signs when the first turn is left.

TABLE 1

| Calculation | Description |
| --- | --- |
| w = s/r | Find angular velocity |
| x = $x_p$ + q * s * cos(i) + q * $W_x$ | Find first turn 205 start |
| y = $y_p$ + q * s * sin(i) + q * $W_y$ | |
| h = x + r * cos(i − 90°) | Find first turn 205 center |
| k = y + r * sin(i − 90°) | |
| w0 = I + 90° | Find first initial angle |
| t = $\theta_a$/w | Find duration of the first turn 205 |
| x = h + r * cos(w0 − w * t) + t * $W_x$ | Find first turn 205 end |
| y = k + r * sin(w0 − w * t) + t * $W_y$ | |
| i = i + w * t | New inertial course (e.g., of the first leg 202) |
| x = $x_p$ + m * s * cos(i) + q * $W_x$ | Find second turn 206 start |
| y = $y_p$ + m * s * sin(i) + q * $W_y$ | |
| h = x + r * cos(i + 90°) | Find second turn 206 center |
| k = y + r * sin(i + 90°) | |
| w0 = I − 90° | Find second initial angle |
| x = h + r * cos(w0 + w * t) + t * $W_x$ | Find second turn 206 end |
| y = k + r * sin(w0 + w * t) + t * $W_y$ | |
| i = i + w * t | New inertial course (e.g., of the second leg 203) |
| x = $x_p$ + p * s * cos(i) + q * $W_x$ | Find third turn 207 start |
| y = $y_p$ + p * s * sin(i) + q * $W_y$ | |
| t = $\theta_c$/w | Find duration |
| h = x + r * cos(i + 90°) | Find third turn 207 center |
| k = y + r * sin(i + 90°) | |
| w0 = I − 90° | Find third initial angle |
| x = h + r * cos(w0 + w * t) + t * $W_x$ | Find third turn 207 end |
| y = k + r * sin(w0 + w * t) + t * $W_y$ | |
| i = i + w * t | New inertial course (e.g., of the third leg 204) |

TABLE 1-continued

| Calculation | Description |
| --- | --- |
| f = intercept( ) | Find f for intercept |
| x = $x_p$ + f * s * cos(i) + q * $W_x$ | Find fourth turn 208 start |
| y = $y_p$ + f * s * sin(i) + q * $W_y$ | |
| h = x + r * cos(i − 90°) | Find fourth turn 208 center |
| k = y + r * sin(i − 90°) | |
| w0 = i + 90° | Find fourth initial angle |
| x = h + r * cos(w0 − w * t) + t * $W_x$ | Find fourth turn 208 end |
| y = k + r * sin(w0 − w * t) + t * $W_y$ | |
| i = i + w * t | Back to original inertial course 201. Complete |

The duration of the third leg 204 may be dependent upon the exit position of the third turn 207. The duration of the third leg 204 may be determined so that at the end of the maneuver, the aircraft 100 intercepts and returns to the original vector 201. The intercept may be calculated as described in the Trajectory Calculations section in the portion entitled "Intercepting a Target Vector in a Wind." When using a given value of $\theta_c$, there may not be enough room to make both the third and fourth turns 207, 208. For example, the end of the fourth turn 208 can "overshoot" the original vector 201. In this case, the method "Finding an Intercept with a Parallel Vector" (also described in the Trajectory Calculations section) may be used to find the intercept.

In a particular embodiment, the AMS 128 of FIG. 1 also calculates a time t, of a closest point of approach (CPA) for two vectors. For example, the AMS 128 may use the following equation:

$$t = \frac{(x1 - x2)(vx2 - vx1) + (y1 - y2)(vy2 - vy1)}{(vx2 - vx1)(vx2 - vx1) + (vy2 - vy1)(vy2 - vy1)}$$

where x1 is an initial x position (e.g., an x coordinate in an x-y plane) of the Ownship (e.g., the aircraft 100 in FIG. 2); y1 is an initial y (e.g., a y coordinate in an x-y plane) position of the Ownship; vx1 is an initial x velocity of the Ownship; vy1 is an initial y velocity of the Ownship; x2 is an initial x position of the Intruder (not shown in FIG. 2); y2 is an initial y position of the Intruder; vx2 is an initial x velocity of Intruder; and vy2 is an initial y velocity of the Intruder.

The time t of the CPA will be negative when the CPA has already occurred (e.g., is in the past and the Ownship and the Intruder are gaining separation). In this case, the distance at the initial position may be taken as the CPA. For a finite time vector (e.g., a vector that is used to approximate the Ownship's path through a turn), the time t can occur after the vector's endpoint (e.g., after the vector stops being used to approximate the Ownship's path through the turn). In this case, the shortest duration is used to find the time of the CPA. Otherwise the time t determined in the equation above may be used to define the time of the CPA.

The positions of the Ownship and the Intruder may be extrapolated to the CPA, and a distance between the Ownship and the Intruder may be calculated at the CPA. The calculated distance is the closest distance that is expected to occur between the Ownship and the Intruder. If the calculated distance is less than a desired separation distance S, a loss of separation (LOS) is predicted to occur.

When computing the CPA for a series of turns and legs, the procedure above may be repeated and a minimum distance may be found. A search time frame may be used to implement the calculations. For example, searches be performed using different time frames, each search may perform calculations from the search frame's start time to the search frame's end time.

To calculate the CPA of a maneuver relative to the Intruder, the lateral maneuver may be used to create a series of linear approximations through the turns (e.g., the turns 205-208 of FIG. 2). For example, Equations (3)-(10) in the Trajectory Calculations section may be used to step through the turns. Successive points and a step time (i.e., a duration of each step) may be used to create a ground vector. An approximation error of this method may be directly proportional to a size of the steps. For example, the error may be $r*[1-\cos(\theta/2)]$, where r is the radius, and $\theta$ is the step angular value. Corresponding ground frame error can increase with winds. The sequence of ground vectors may be used to find a minimum distance between the lateral maneuver and the Intruder's ground vector using the CPA calculation techniques described above.

Thus, the AMS 128 of FIG. 1 may use a decomposition that breaks apart a multiple variable constrained optimization problem into a more efficient series of single variable problems. For example, a set of control variables may be held constant while a search is performed for a particular control variable. Each search may be conducted as a standard zero/root-finding problem. A false position method may be used to solve standard zero/root-finding problem. The false position method converges if the problem is bounded, so the problem decomposition was designed to create bounds for the searches. In this context, "bounded" means, that for a single variable function f(x) and two initial values for x, x0 and x1, a solution f(x0) and a solution f(x1) are of opposite polarity. That is, f(x) has a zero value between f(x0) and f(x1). The function f(x) in the process described above is the minimum CPA distance minus the desired miss distance S. This function is zero when the minimum CPA distance and the desired miss distance are equal, is positive when there is extra separation (i.e., when the minimum CPA distance is greater than the desired miss distance), and is negative when there is a LOS (i.e., when the minimum CPA distance is less than the desired miss distance).

The calculations described above may be simplified by setting $\theta_c$ equal to $\theta_a$. Further simplification may be achieved by only using turns in a particular direction as the initial turn of the lateral maneuver. For example, the initial turn may be constrained to be a right turn. Setting $\theta_c$ equal to $\theta_a$ and requiring that the initial turn be in a particular direction reduces the number of control variables to four ($\theta_a$, m, p, q). To perform the calculations, either $\theta_a$ or m is needed, but not both. Thus, only three false position searches may be performed to find the complete maneuver. An initial test may be used to determine constraints of the lateral maneuver. For example, in the initial test, an angular distance of the first and second turns 205, 206 of FIG. 2 may be set to a maximum value (e.g., 90°), and a length or duration of the first leg 202 may be set to minimum value (0 meters). The initial test will find that either there is still a LOS or there is not. When there is not a LOS in the initial test, then there may be no reason to extend the length of the first leg 202 since extending the first leg 202 would only provide extra separation that is not needed to avoid the LOS. Accordingly, the first leg 202 may be constrained to the minimum value used for the initial test. In this case, the angular distance of the first and second turns 205, 206 may be reduced to less than the maximum value (e.g., to less than 90°) to reduce the distance traveled. When there is a LOS in the initial test, the angular distance of the first and second turns 205, 206 may remain at the maximum value (e.g., 90°) and no search for $\theta_a$ is needed. In this case, the length of the first leg 202 may be increased to achieve separation (i.e., to avoid the LOS). Accordingly, a search for m may be performed.

Figure 3:
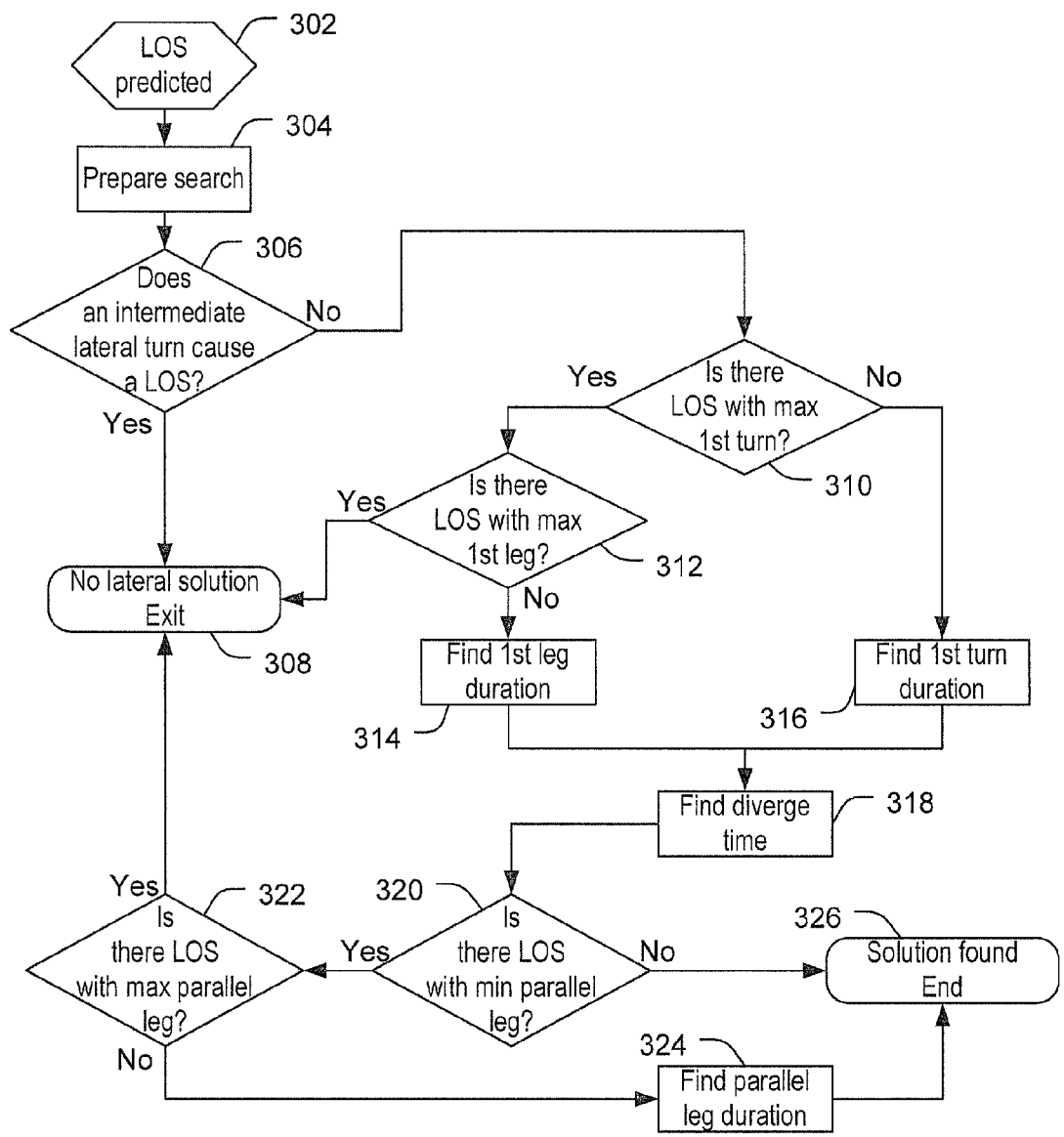
FIG. 3 is a flow chart of a particular embodiment of a lateral avoidance maneuver solving method.

FIG. 3 is a flow chart of a particular embodiment of a lateral avoidance maneuver solving method. In FIG. 3, false position searches are conducted at 314, 316, 318 and 324. When a closest point of approach (CPA) that is less than a separation distance S is identified, a LOS is predicted, at 302. At 304, a search is prepared. Preparation for the search may include setting variables as follows:

| $\theta_a$ | $\theta_c$ | m | p | q |
|---|---|---|---|---|
| max | max | min | max | min |

Maximum and minimum values of each variable may be predetermined, for example, based on a mission specification, based on characteristics of the Ownship, or based on other criteria. In a particular embodiment, the minimum value of q may be zero (i.e., $q_{min}=0$ sec) and the maximum value of $\theta_a$ may be ninety degrees (i.e., $\theta_{a,max}=90$ degrees). These values specify a maneuver that starts immediately and makes the maximum first turn 205. These values also extend the duration p of the second leg 203 of the maneuver that is parallel to the original path 201.

In certain circumstances, it is possible that no lateral maneuver solution exists to avoid the LOS (e.g., when the LOS is too imminent). To determine whether a lateral maneuver solution exists, a miss distance is tested from a beginning of the first turn 205 through the second turn 206, at 306. When there is a LOS at 306, no lateral maneuver solution exists, and the method exits, at 308. When no lateral maneuver solution exists, another solution to the LOS may be determined, such as changing speed or changing altitude.

When there is a LOS at 306, one or more searches may be performed to determine a lateral maneuver to avoid the LOS. At 310, a determination may be made to select a variable to be searched for. For example, the initial test described above may be performed by determining whether the LOS occurs with a maximum value of the first turn 205 (i.e., a maximum first turn duration) and a minimum duration of the first leg 202 (i.e., a minimum first leg duration). When there is no LOS at 310, the maximum first and second turns are sufficient, and a search may be performed, at 316, to find a reduced turn duration that avoids the LOS with the minimum first leg duration. When there is a LOS, at 310, then a determination may be made, at 312, whether there is a LOS with a maximum first leg duration and maximum first turn duration. When the maximum first leg duration and maximum first turn duration result in a LOS, there is no lateral maneuver solution, and the method exits at 308. When the maximum first leg duration and maximum first turn duration do not result in a LOS, a search is performed, at 314, to find a first leg duration that is less than the maximum first leg duration that does not result in a LOS using the maximum first turn duration.

Whether the search 314 for the first leg duration is performed or the search 316 for the first turn duration is performed, the search frame ends at the end time of the parallel leg (i.e., the second leg 203 f FIG. 2). The false position method is used to find the first leg duration or the first turn duration which causes the CPA to equal the desired miss distance. The false position method bounding values are the minimum and maximum of the searched for variable (e.g., the first leg duration or the first turn duration). To illustrate, for the search 316 for the first turn duration, the bounding values are a minimum duration turn and a maximum duration turn. With the first turn duration set to the minimum (e.g., zero), the maneuver illustrated in FIG. 2 collapses and the path is simply the original path 201. Since the original path 201 had a LOS (as identified at 302), a zero turn duration will result in a LOS and the f(0) has a negative value (i.e., the minimum CPA distance is less than the desired miss distance). The maximum turn duration does not result in a LOS (as determined at 310), and the f(max) has a positive value (i.e., the minimum CPA distance is greater than the desired miss distance). Accordingly, the function f(x) is bounded.

For the search 314 for the first leg duration search, the bounding values are a minimum leg duration and a maximum leg duration. Using the minimum leg duration there is still a LOS (as determined at 310) and the f(min) is negative. Using the maximum leg duration there is not LOS (as determined at 312) and the f(max) has a positive value. Accordingly, the function f(x) is bounded.

Figure 4:
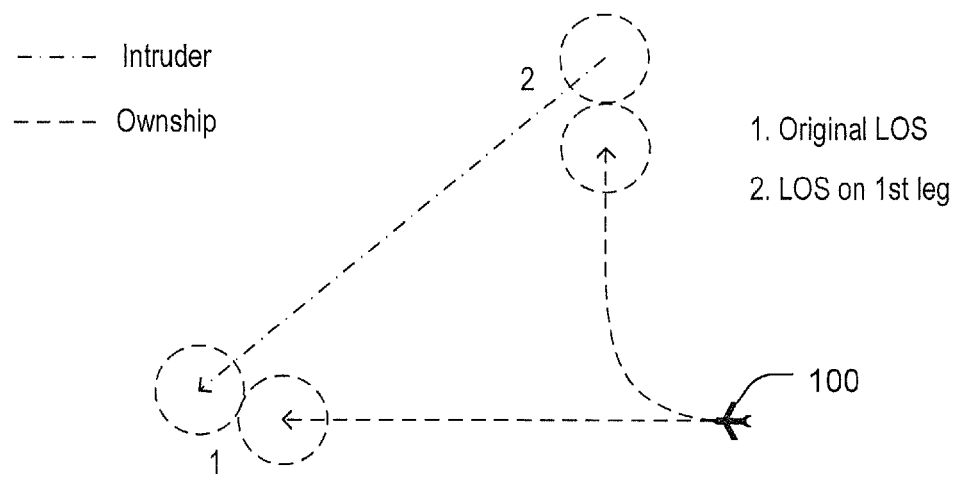
FIG. 4 is a diagram showing a potential case where there is no lateral maneuver solution.

FIG. 4 is a diagram showing a potential case where there is no lateral maneuver solution. In FIG. 4, a loss of separation has been predicted at encounter 1 (e.g., the "original LOS"). Additionally, performing a lateral maneuver using the maximum duration of the first leg also causes an LOS (i.e., the "LOS on the $1^{st}$ leg") at encounter 2. The circumstance illustrated in FIG. 4 can be identified by the decision performed at 312 in FIG. 3. That is, when the decision at 312 is that a LOS results when the first leg duration has a maximum value and the first turn duration has a maximum value, the function f(x) is unbounded and the process exits, at 308, because there is no lateral solution.

Figure 5A:
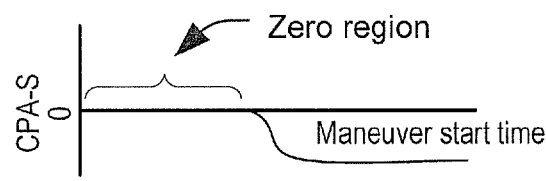
FIG. 5A is a conceptual graph showing a function of diverge time when a parallel leg is included in a closest point of approach (CPA) calculation.
Figure 5B:
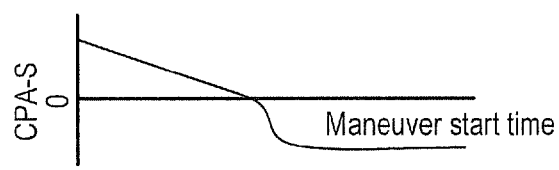
FIG. 5B is a conceptual graph showing a function of diverge time when a parallel leg is not included in a closest point of approach (CPA) calculation.

Another search is performed at 318 to find a maneuver start or diverge time q. A false position method may be used to perform the search. A search frame for the false position search may start at the current time. The search frame may end at an end time of the second turn 206. The first leg duration and the first turn duration have already been determined such that the CPA of the parallel leg (i.e., the second leg 203 of FIG. 2) is equal to the desired miss distance. Accordingly, if the parallel leg is included in the CPA calculation for the search at 318, the function f(x) will have a large zero region (i.e., a region in which the CPA is equal to the desired miss distance) which would obscure the search as shown in the conceptual graph in FIG. 5A. The zero region may cause the false-position search to find an arbitrary value for the diverge time. Accordingly, the parallel leg is excluded from the search, resulting in the function shown in the conceptual graph shown of FIG. 5B.

When the search 318 for the diverge time is performed, values of the turns and legs of a maneuver that avoid the LOS have already been identified. The search 318 for the diverge time is to maximize the start time of the maneuver (i.e., to delay the maneuver as long as possible to allow uncertainties to resolve). The earlier search (i.e., the search 314 for the first leg duration or the search 316 for the first turn duration) used the minimum start time value. Since there was not a LOS using the minimum start time value, the function f(min) has a positive value. The maximum start time is when the original LOS (identified at 302) starts. Thus, the function f(max) has a negative value, and the problem is bounded.

Figure 6:
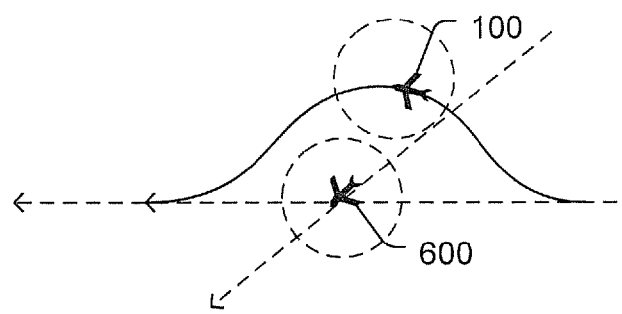
FIG. 6 is a diagram showing a potential case where a parallel leg of minimum duration (i.e., no parallel leg) does not result in a LOS.

At 320, a determination may be made whether a minimum parallel leg duration causes a LOS. If the minimum parallel leg duration does not cause a LOS, the minimum parallel leg duration is used and the method ends, at 326, since a solution has been found. FIG. 6 is a diagram showing a potential case where a parallel leg of minimum duration (i.e., no parallel leg) does not result in a LOS. That is, the turns by themselves provide a resolution whereby the aircraft 100 (i.e., the Ownship) avoids a second aircraft 600 (e.g., the Intruder). In this case, a search for the length of the parallel leg (such as the search performed at 324) would be unbounded. However, the resolution is conflict free so the process simply ends successfully at 326. The parallel leg may be used primarily for "passing," and, thus, may often not be used.

When the parallel leg is to be used for passing, the maximum parallel leg duration should resolve the LOS for the function to be bounded. At 322 of FIG. 3, a determination may be made whether there is a LOS when the duration of the parallel leg has a maximum value. When there is a LOS using the maximum value of the parallel leg duration, the function f(max) has a negative value. Accordingly, the function is unbounded and the procedure exits at 308.

When there is no LOS using the maximum value of the parallel leg duration, the function f(max) has a positive value, and the function is bounded. In this case, the method proceeds to 324 where a search may be performed to find a duration of the parallel leg. A false position method may be used to perform the search 324 for the duration of the parallel leg. The search frame may start at a beginning of the third turn. As explained above, the CPA of the parallel leg is equal to the desired miss distance. If the parallel leg is included in the CPA calculation, the function may have a large zero region which may mask the search as shown in the conceptual graph in FIG. 5A. The end of the search frame should be a reasonably distant time in the future. When the parallel leg duration is identified, the process then ends successfully at 326.

Figure 7:
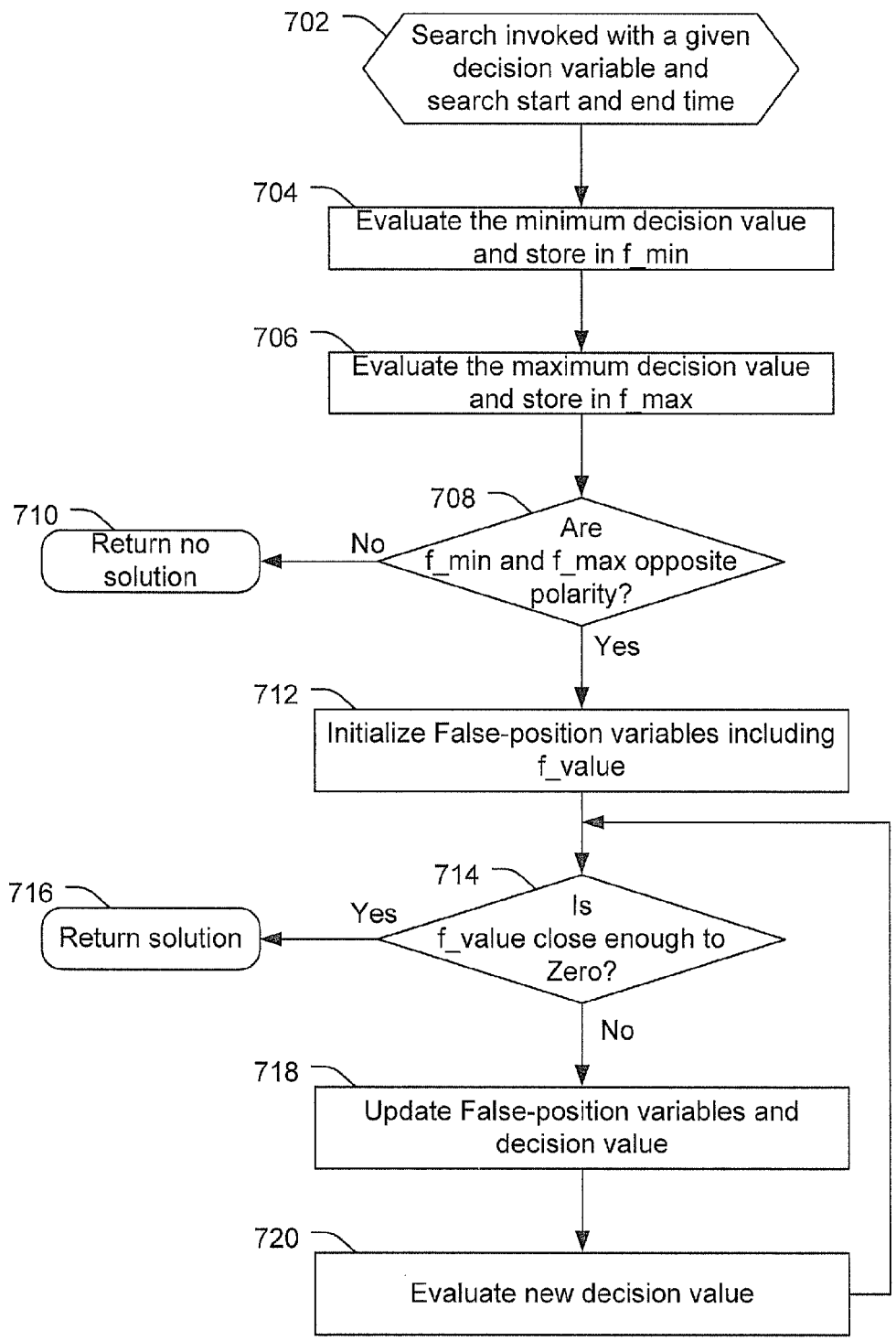
FIG. 7 is a flow chart of a particular embodiment of a false-position search method.

FIG. 7 is a flow chart of a particular embodiment of a false-position search method. The false-position search method of FIG. 7 may be used for one or more of the searches 314, 316, 318 and 324 of FIG. 3. At 702, a search function is invoked with a given decision variable, a search start time, and a search end time. The search start time and search end time bound the search frame for the search. At 704, the decision value resulting from the input of a minimum value of the decision variable is evaluated. The resulting minimum decision value is stored in f_min. To illustrate, when the decision variable is the first turn duration, a value of the function may be determined using the minimum first turn duration. At 706, the decision value resulting from the input of the maximum value of the decision variable is evaluated, and the resulting maximum decision value is stored in f_max. For example, the values f_min and f_max may be the minimum and maximum values, respectively, of the function ($CPA_{min}$–S), where $CPA_{min}$ is the minimum CPA distance and S is the desired miss distance.

At 708, a determination is made whether f_min and f_max have opposite polarities. When f_min and f_max do not have opposite polarities, then the search is exited, at 710, and a message may be returned indicating that no solution exists. When f_min and f_max have opposite polarities, the false-position variables are initialized including f_value, at 712. Note that in a particular embodiment, it may be known in advance that f_min and f_max have opposite polarities. For example, when the search 314 is performed in the method of FIG. 3, a determination has already been made, at 310, that there is a LOS when the first leg duration is minimum (i.e., f (min) for the first leg duration); therefore, the function f(min) has negative value, (i.e., there is a LOS). A determination has also been made, at 312, that there is not a LOS when the first leg duration is maximum (i.e., f (max) for the first leg duration); therefore, the function f(max) has positive value. In embodiments where the polarities of f_min and f_max are known to be opposite in advance, the method of FIG. 7 may start at 712 with initializing the false-position search variables.

At 714, a determination is made whether f_value is sufficiently close to zero. A configurable buffer value s may be used to specify a threshold that determines when the f_value is sufficiently close to zero. For example, when f_value≤∈, f_value may be considered to be sufficiently close to zero. When f_value is sufficiently close to zero, the solution to the root-finding problem is returned at 716. When f_value is not sufficiently close to zero, the false-position variables are updated and a new decision value is set, at 718. The new decision value may be evaluated, at 720, and the search process may return to the decision of whether or not the f_value is sufficiently close to zero, at 714. The process may continue iteratively in this manner until a solution is identified and returned at 716.

The term "false-position variables" refers to variables used by the false-position search, which variables are known to persons skilled in the art. For example, the false-position variables may include the decision variable and the variables listed and described below:

Input Variables:

val_max—stores a maximum value that will be passed into a function, such as the function described with reference to FIG. 8. For example, when the search is for the first turn duration, vat max may be 90°.

val_min—stores a minimum value that will be passed into the function. For example, when the search is for the first turn duration, val_min may be 0°.

max_iterations—the false-position method usually has two escapes (i.e., ways to terminate the process). A first escape may be when output of the function is determined to be close enough to zero (e.g., as determined at 714 of FIG. 7). A second escape may be when a maximum number of tries has been reached. The max_iterations variable may be used to specify the maximum number of tries.

Local Variables:

iteration—each time the search iterates, the iteration variable may be incremented to maintain a count for comparison to the max_iterations variable. The iteration variable may be initialized to 0.

val_right—stores a value used to bound the right side. The val_right variable may be initialized to a value of the val_max variable.

val_left—stores a value used to bound the left side. The val_left variable may be initialized to a value of the val_min variable.

val_decision—stores a value for the decision variable. When the value in val_decision causes the function to output approximately zero, the val_decision variable that is outputted by the false-position method. The val_decision variable may be initialized to 0.

func_val_right—stores a value of the function output caused by inputting a value of the val_right variable into the function. The func_val_right variable may be initialized to a value of the function output caused by the value of the val_max variable.

func_val_left—stores a value for the function output caused by inputting a value of the val_left variable into the function. The func_val_left variable may be initialized to a value of the function output caused by the value of the val_min variable func_val_decision—stores a value of the function output caused by inputting the value of the val_decision variable into the function. The func_val_decision variable may be initialized to 0.

side—the function has an input value that causes 0 to be output. The x-axis values to the right of the zero are called the right side, and the other values are called the left side. The false-position method keeps track of what side the current value of the val_decision variable causes to be output. The side variable may be initialized to 0. After the first iteration, the side variable may be either +1 (i.e., when the output of the function is on the right side), or −1 (i.e., when the output of the function is on the left side).

Figure 8:
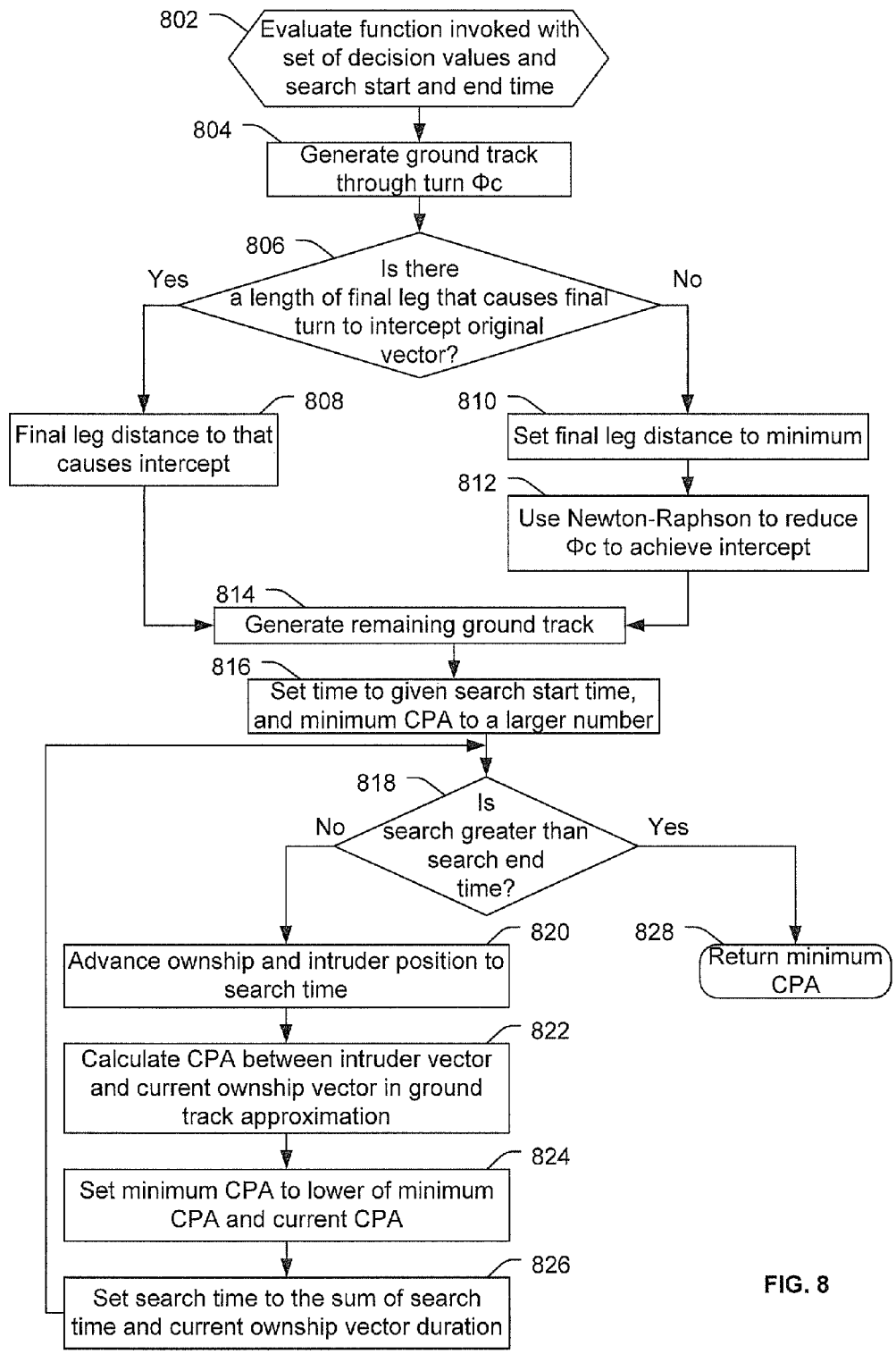
FIG. 8 is a flow chart of a particular embodiment of a method of determining a closest point of approach (CPA)

FIG. 8 is a flow chart of a particular embodiment of a method of determining a closest point of approach (CPA). The method of FIG. 8 may be used each time the function is evaluated in FIG. 7, i.e., at 704, 706, and 720 of FIG. 7. The method of FIG. 8 may be used to calculate a single-value, minimum CPA.

At 802, an evaluation function of FIG. 8 is invoked with a set of decision values, a search start time and a search end time. At 804, a ground track may be generated from the search start time to the search end time (e.g., through the third turn 207 of FIG. 2). At 806, a determination is made whether a length of a final leg (e.g., the third leg 204 for FIG. 2) exists that will cause the final turn to intercept the original vector. For example, calculations described in the Trajectory Calculation section may be used to make the determination.

When a length of the final leg that will cause the final turn to intercept the original vector exists, that final leg distance is set to the value that causes the intercept, at 808. The evaluation process then generates the remaining ground track, at 814. When no final leg length causes the final turn to intercept the original vector, the final leg distance is set to a minimum value, at 810. A Newton-Raphson method may be used (as described in the Trajectory Calculation section) to reduce $\theta_c$ until the intercept with the original vector is achieved, at 812. The remaining ground track may be generated at 814.

At 816, a search time is set to the given search start time and a minimum CPA value may be set to a large number. At 818, a determination is made whether the search time is greater than the search end time. When the search time is not greater than the search end time, the evaluation function advances (i.e., extrapolates) the Ownship and the Intruder positions to the search time, at 820. The CPA between the Intruder vector and the current Ownship vector in the ground track approximation is calculated, at 822. The minimum CPA is set to the lower of the minimum CPA and the current CPA (determined at 822), at 824. The search time is set to the sum of the search time and the duration of the current Ownship vector, at 826. The evaluation function then loops back to determine whether the search time is greater than the search end time, at 818. The method iteratively repeats 820, 822, 824, 826 and 818 until the search time is greater than the search end time. During each iteration, the CPA is calculated for each vector based on the heading of the current vector. When the search time becomes greater than the search end time, then the present value for the minimum CPA is returned, at 828.

The lateral maneuver solving systems and methods disclosed may determine a maneuver to maximize time until execution, minimize deviation from an original path, and provide a desired miss distance. For example, the above-described systems and methods may be used to output a route change that will achieve a desired miss distance and return an aircraft, such as an unmanned aerial vehicle, to its original path or trajectory. The route change may be determined as a function of one or more of the desired miss distance, the desired bank angle, and a state vector for the aircraft, a state vector for wind, and a state vector for an Intruder.

Trajectory Calculation Section

Calculations in this section may be performed using radians to specify angles. However, degrees are shown for the reader's convenience.

Common equations for motion with no vertical (altitude) velocity may include the following:

$$x = x_0 + t*v_x + t*W_x \quad (1)$$

$$y = y_0 + t*v_y + t*W_y \quad (2)$$

$$h = r*\cos(w_0 + 180°) + t*W_y \quad (3)$$

$$k = r*\sin(w_0 + 180°) + t*W_y \quad (4)$$

$$x = h + r*\cos(w*t) + w_0)t*W_y \quad (5)$$

$$y = k + r*\sin(w*t + w_0) + t*W_x \quad (6)$$

$$x = h + d*\cos(c) + t*W_y \quad (7)$$

$$y = k + d*\sin(c) + t*W_x \quad (8)$$

$$w_0 = i - 90° \text{ (left turn)} \quad (9)$$

$$w_0 = i + 90° \text{ (right turn)} \quad (10)$$

where Eqs. (1) and (2) relate to linear motion/extrapolation; and Eqs. (3)-(10) relate to circular motion.

The equations for a wind triangle may include the following:

$$v_{xi} = v_{yg} + W_y \quad (11)$$

$$v_{yi} = v_{xg} + W_x \quad (12)$$

$$i = a \tan 2(v_{xi}, v_{yi}) \quad (13)$$

$$\text{inertial speed} = sqrt(v_{xi}*v_{xi} + v_{yi}*v_{yi}) \quad (14)$$

$$c = a \tan 2(v_{xg}, v_{yg}) \quad (15)$$

In Eqs. (1)-(15), $x_0$ is an initial x position; $y_0$ is an initial y position; $v_x$ is an x velocity component of the Ownship; $v_y$ is a y velocity component of the Ownship; $v_{xi}$ is an x inertial velocity component of the Ownship; $v_{yi}$ is a y inertial velocity component of the Ownship; $v_{xg}$ is an x ground velocity component of the Ownship; $v_{yg}$ is a y ground velocity component of the Ownship; $w_0$ is an initial angle, direction from center to circle start; w is the angular velocity; $W_x$ is an x velocity component of the wind; $W_y$ is a y velocity component of the wind; i is an inertial course; h is a circle center x value; k is a circle center y value; c is a ground direction of extrapolation (course); d is a distance of extrapolation; and t is time from either $w_0$ or $x_0$.

Figure 9:
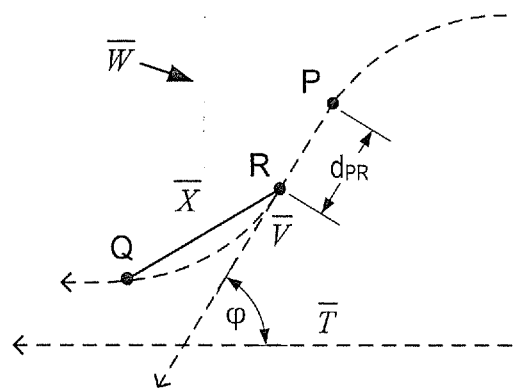
FIG. 9 is a drawing showing components used to determine turns in a particular embodiment.

FIG. 9 is a drawing showing components used to determine turns in a particular embodiment. In FIG. 9, a point P is an initial position, and a point R is a distance d, from the initial position P along a ground velocity vector $\nabla$. A point Q is a fixed distance from R along a fixed vector $\overline{X}$. FIG. 9 also shows a ground target vector $\overline{T}$ and a wind vector $\overline{W}$. The distance d is the ground distance between two turns, such as the third and fourth turns 207, 208 of FIG. 2.

In a particular embodiment, the last two turns (e.g., the third and fourth turns 207, 208 of FIG. 2) are preset and need not be calculated. When using the lateral maneuver, the direction after the last turn (i.e., after point Q in FIG. 9) is correct when the direction is equal to the direction of the target vector. However, a final position, at point Q, may overshoot or undershoot the target vector. Thus, the distance d may be determined such that the point Q is on the target vector. The process described below is general, and may be used so long as the final direction equals the direction of the target vector. Thus, for example, the vector before P does not need to be parallel to the target vector.

The solution is found by "sliding" R along $\nabla$ until the point Q falls on $\overline{T}$. The point Q is a fixed distance and direction from the point R, so R and Q have a "rigid" relationship. In general, the true path between R and Q is irrelevant and could consist of many turns and legs.

The problem may be solved by rotating and/or translating the components so that the target vector is the x axis, then solving for the value of $d_{PR}$ where $y_Q$ (i.e., the y axis coordinate of the point Q) equals zero. Since the solution is the ground distance, the winds are not needed to solve it. However, the winds may be used to convert the ground vector $\nabla$ into an inertial vector. The problem statement is as follows: Given inputs: P, $\nabla$, $\overline{T}$, $\overline{W}$ and $\overline{X}$ or Q, find d. The solution may be determined as follows:

Rotate and/or translate the system as shown in FIG. 9, such that the target vector is the x axis. The point of rotation can be any point on the target vector.

Let the constant f represent the distance between R and Q
1) $y_R = y_P + d_{PR}*\sin(\phi_V)$ Extrapolation P to R
2) $y_Q = y_R + f*\sin(\phi_X)$ Extrapolation R to Q
3) $y_Q = y_P + d_{PR}*\sin(\phi_V) + f*\sin(\phi_X)$ Plug 1 into 2
4) $0 = y_P + d_{PR}*\sin(\phi_V) + f*\sin(\phi_X)$ Set $y_Q = 0$
5)

$$d_{PR} = -\frac{[y_P + f*\sin(\varphi_X)]}{\sin(\varphi_V)}$$

Solve for $d_{PR}$

The value of $d_{PR}$ is not defined when the direction of the vector $\nabla$ is 0° or 180° relative to the target vector $\overline{T}$. This means that when traveling parallel or anti-parallel to the vector $\overline{T}$, adjusting $d_{PR}$ has no effect on the distance from Q to the vector $\overline{T}$. With the lateral maneuver disclosed herein, the third turn will have some duration so the vector $\nabla$ will not be parallel or anti-parallel to the vector $\overline{T}$.

The value of $d_{PR}$ may be negative, which indicates that R needs to be extrapolated backwards toward P. This condition is considered "overshoot" and means the duration of the two turns is too great and, when $d_{PR}$ is zero, Q is below T (negative y region). A method to address an overshoot condition is described below.

Figure 10:
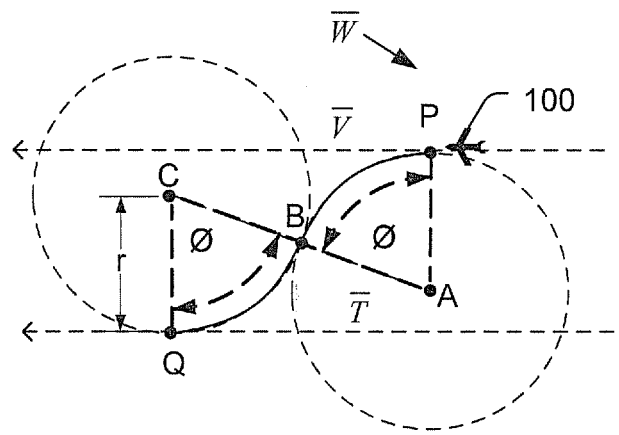
FIG. 10 is a drawing showing components used to determine turns in a particular embodiment.

Intercepting a parallel vector in a wind may be solved by finding an appropriate turn duration for two opposing turns. Since the target vector is parallel to the vector being traveled, the turns are equal in duration and opposite in direction. The problem is illustrated in FIG. 10. The components shown in FIG. 10 include: an initial position P; a ground velocity vector $\nabla$ starting at P; a ground target vector $\overline{T}$; a wind vector $\overline{W}$; a turn radius r; center point A of right-side turn; a center point C of left-side turn; a midpoint B between centers A and C; a starting inertial course i, calculated from $\nabla$ and $\overline{W}$; a duration t of a single turn; and an angular velocity w.

The problem may be solved by rotating and/or translating the system so the target vector $\overline{T}$ is the x axis and the first turn is left. A value of t may be calculated that causes the y value of Q, $y_Q$, to equal zero, where t is the duration used for each turn (not the sum of durations). Therefore, the duration from P to Q is 2 t.

Assuming that no backwards motion is desired, the maximum value of t may be the time it takes the first turn to change the ground course by 90°. This value may be found, after the rotation, by finding the inertial course for a 270° ground vector, which is the normalized ground course of 180° plus 90°. The change in inertial course c, may be converted into a time limit s=c/w, where the angular velocity w is (inertial speed)/radius. The turn centers change with the angle because they are referenced to their respective inertial vector, so the wind vector may be used to solve the problem. Also the initial angle $w_0$ of the second turn is dependent on the first center point.

To solve the problem, the Newton-Raphson method may be used. The Newton-Raphson method is described in detail in the Handbook of Mathematics by Bronshtein et al. (which is incorporated herein by reference in its entirety). The function f(t) is the y value of Q. The function is as follows: Given inputs P, $\overline{V}$, $\overline{T}$, $\overline{W}$, r; find s.

The solution may be found as follows:
Rotate and/or translate the system as shown in FIG. 10, such that the target vector $\overline{T}$ is the x axis. The point of rotation can be any point on the target vector.
$w_{0A} = i_A + 90°$
$k_A = r*\sin(w_{0A} + 180°) + t*W_y$
$y_B = r*\sin(w_{0A} - w*t) + t*W_y$ Intermediate point
$w_{0C} = w_{0A} - w*t + 180°$ Opposite first final angle
$k_C = r*\sin(w_{0C} + 180°) + t*W_y$
$y_Q = k_C + r*\sin(w*t + w_{0C}) + t*W_y$ Using the last equation above, a standard calculus-based derivative may be then calculated and used with the Newton-Raphson method. The initial value of t is set to ½ the range of t.

Speed Maneuvering

Figure 11:
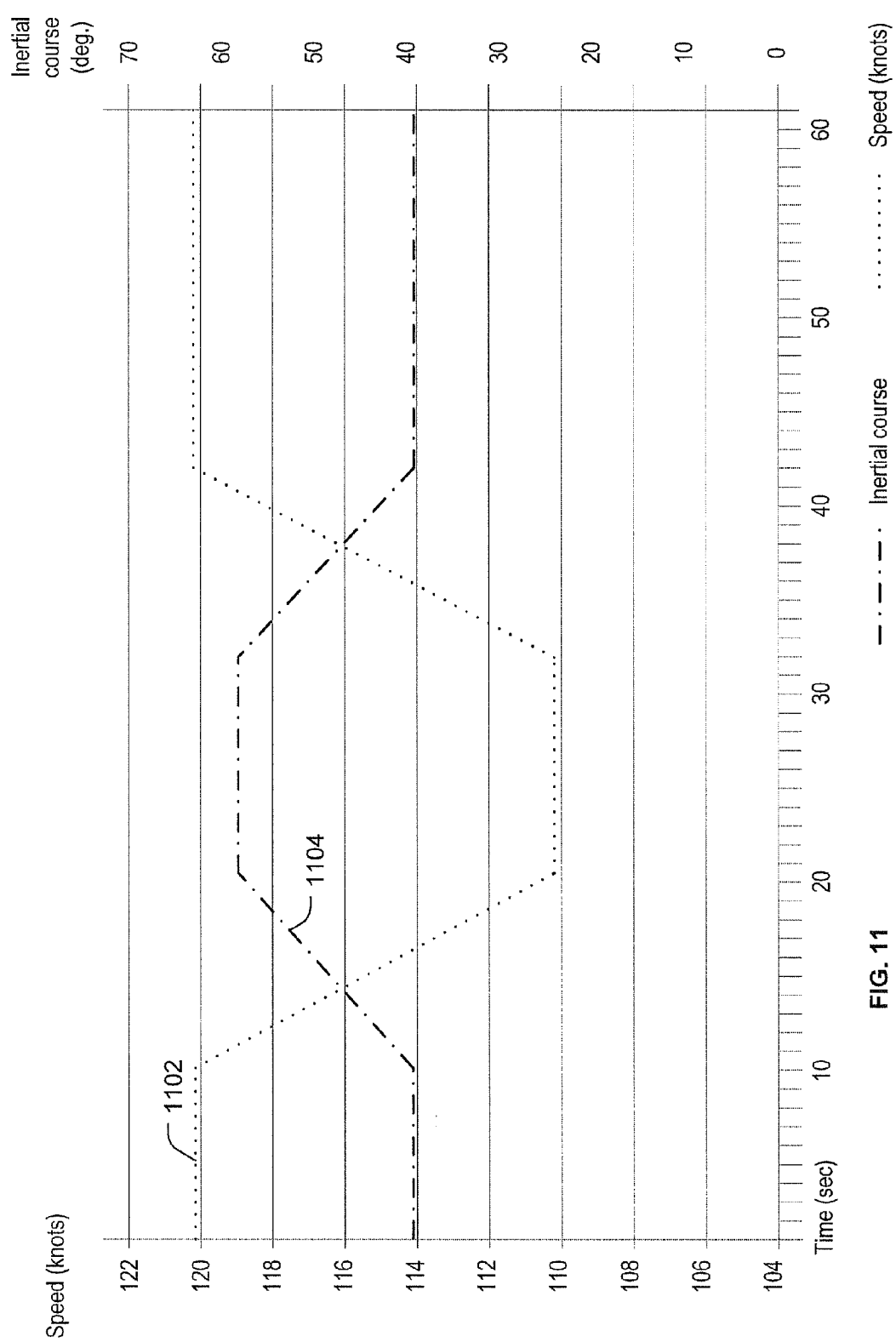
FIG. 11 is a diagram illustrating a change in inertial course corresponding to a change in speed in a particular embodiment.

In a particular embodiment, as illustrated in FIG. 11, a speed maneuver to avoid a loss of separation may be implemented in four phases. The diagram of FIG. 11 illustrates a change in inertial course 1104 corresponding to a change in speed 1102. The left y axis of the diagram indicates inertial speed and the right y axis of the diagram indicates the inertial course. In a first phase (between about 0 seconds and about 10 seconds in FIG. 11), a vehicle (e.g., the Ownship) maintains speed. For example, the Ownship may be assigned a speed based on mission parameters, input from a remote pilot, or other factors. The assigned speed may be maintained until a speed change maneuver is executed to avoid a loss of separation. In a second phase (between about 10 seconds and about 20 seconds in FIG. 11), the vehicle may decelerate to a reduced speed. In a third phase (between about 20 seconds and about 32 seconds in FIG. 11), the vehicle holds the reduced speed. In a fourth phase (between about 32 seconds and about 42 seconds in FIG. 11), the vehicle accelerates from the reduced speed to the assigned speed and maintains the assigned speed.

When there is a wind vector and the vehicle slows its inertial speed, the vehicle's ground course may also change. The change in the ground course may be reduced by changing the inertial course according to a wind triangle to compensate for the reduced inertial speed and the wind vector.

In a particular embodiment, a speed maneuver can be specified using three control variables: a distance $X_S$, from a current position to a position where deceleration begins; a percent speed reduction $X_P$ from a target or assigned speed; and a hold distance $X_H$ to hold the reduced speed. Configurable deceleration and acceleration parameters may be used with the control variables to project the Ownship trajectory. The configurable deceleration and acceleration parameters may define rates at which the Ownship decelerates and accelerates, respectively, to implement a speed maneuver.

The start distance $X_S$ may have a range from 0 (i.e., start immediately) to a distance $d_L$, which corresponds to a distance to where the LOS is predicted to occur. Thus, the vehicle could start decelerating anytime from immediately to a time when the LOS occurs. The percent speed reduction $X_P$, may have a range from zero (i.e., no reduction in speed) to a ratio $p_M$, which corresponds to the target speed minus a minimum allowable inertial speed divided by the target speed. The minimum inertial speed may be specified based on the vehicle, the mission of the vehicle, or other factors. For example, the minimum inertial speed may be set based on a stall speed of the vehicle with an appropriate safety factor.

The hold distance $X_H$ may have a range from 0 (i.e., no hold) to $d_L$ (i.e., the distance to where the LOS is predicted to begin). For example, the hold distance $X_H$ may be zero when the vehicle decelerates to a reduced speed and then immediately begins to accelerate to the target speed. To illustrate, in certain circumstance, the deceleration and acceleration may be implemented slowly, and no hold may be needed to avoid the LOS. However, in a similar circumstance, the deceleration may be implemented immediately and rapidly, in which case the vehicle may hold the reduced speed for a longer distance.

The control variables may be used to generate a velocity schedule along a current ground vector. For example, the equations of motion and extrapolation listed in the Trajectory Calculation section may be used. In an illustrative embodiment, the control variables are used to create a linear approximation of the trajectory of the vehicle. The approximation of the trajectory may include a series of vectors, where each vector has a position, a velocity, and a duration. This process is explained further with reference to FIG. 12.

Figure 12:
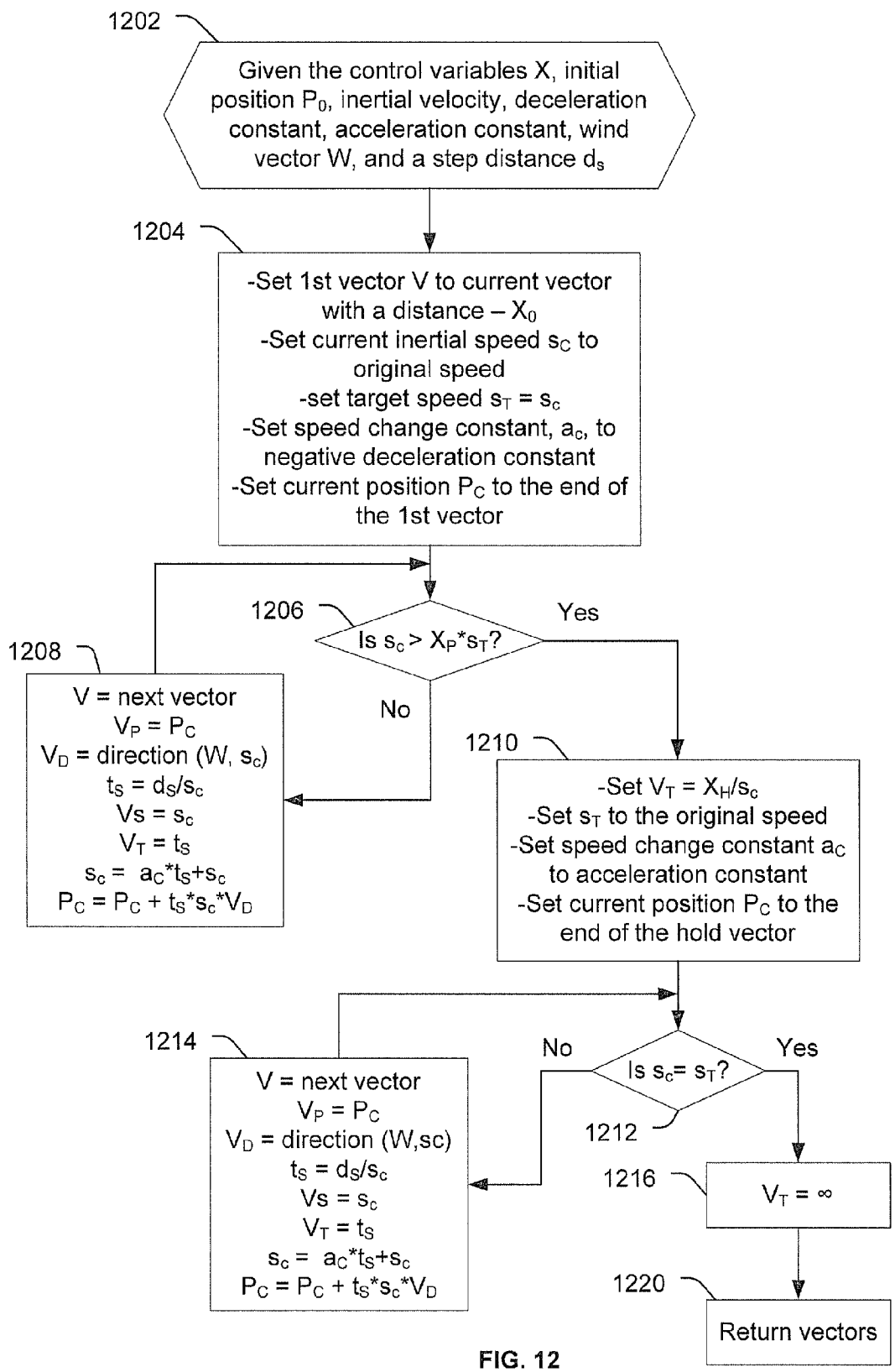
FIG. 12 is flow chart of a particular embodiment of a method of determining a trajectory.

FIG. 12 is flow chart of a particular embodiment of a method of determining a trajectory of a vehicle. In FIG. 12, each asterisk represents the multiplication operator, either between scalars, or between a scalar and a vector. Other symbols that are used include:
X—a control variables vector
$P_0$—an initial Ownship position
$P_C$—a current Ownship position for calculation
W—a wind vector
$d_S$—a step distance
$s_C$—a speed for the current iteration
$t_S$—a vector duration
$s_T$—a target speed
$a_C$—a speed change constant that specifies a rate of change of speed to be used to execute a speed maneuver
V—a vector that is being calculated. Components of the vector V include:
$V_P$—a position of the vector
$V_D$—an inertial course (direction) of the vector
$V_T$—a duration of the vector
$V_S$—a speed of the vector The method of FIG. 12 is invoked, at 1202, with the control variables vector X, the initial position $P_0$, the inertial velocity, a deceleration constant, an acceleration constant, the wind vector W, and the step distance $d_S$. The method of generating the deceleration phase (i.e., the second phase described with reference FIG. 11) is prepared for, at 1204. At 1204, a vector is created that extends from the current position through the start distance $X_S$. At 1206, a determination is made whether the current inertial speed $s_C$ has been reduced by the percent speed reduction $X_P$. For example, the determination may compare a value of the current inertial speed $s_C$ to a value of the percent speed reduction $X_P$ times the target speed $s_T$.

At 1208, a vector in a velocity schedule may be determined. At 1208, an equation $V_D$=direction(W, $s_C$) may be used to calculate the inertial course given the wind vector and the inertial speed. This calculation may be performed by applying the Law of Sines (using an intersection angle of the vectors magnitudes of the wind vector and the inertial speed and direction), given the wind direction, wind magnitude (speed), ground course, and inertial magnitude (speed). The step distance is configurable, and may affect the linear approximation error. New values of $s_C$ may be iteratively calculated at 1208 until the current inertial speed $s_C$ is determined to be reduced by the percent speed reduction $X_P$, at 1206.

After the current inertial speed $s_C$ is determined to be reduced by the percent speed reduction $X_P$, a hold distance indicated by $X_H$ may be determined, at 1210. Additionally, calculations for an acceleration phase (e.g., the fourth phase described with reference to FIG. 11) may be prepared.

At 1212, a determination may be made whether the current inertial speed $s_C$ is equal to the target speed $S_T$ (i.e., the original speed). When the current inertial speed $s_C$ is not equal to the target speed $S_T$, a vector in the velocity schedule is generated, at 1214. Additional vectors are generated at 1214 iteratively until the current inertial speed $s_C$ is determined to be equal to the target speed $s_T$, at 1212. When the current inertial speed $s_C$ is determined to be equal to the target speed $s_T$, the duration of a last vector in the velocity schedule is assumed to be indefinite, at 1216, which implies that the Ownship has returned to a commanded trajectory and speed, and remains on the commanded trajectory and speed indefinitely. The method exits at 1220 when the full velocity schedule has been generated.

In a particular embodiment, an avoidance maneuvering system, such as the AMS 128 of FIG. 1, may calculate a time of the closest point of approach (CPA) for two vectors using the following equation:

$$t = \frac{-(V_P - U_P) \cdot (V_G - U_G)}{(V_G - U_G) \cdot (V_G - U_G)}$$

where U is the Intruder vector, V is one of the vectors approximating the Ownship trajectory, $V_P$ and $U_P$ are positions, $V_G$ and $U_G$ are ground velocities, and $\cdot$ is the vector mathematics dot-product operator. The ground velocity may be determined as $V_S * V_D \cdot W$, where $V_S$ and $V_D$ may be determined as described with reference to FIG. 12.

The time t of the CPA will be negative when the CPA was in the past and the Ownship and the Intruder are gaining separation. In this case, the distance at the initial position may be taken as the CPA. For finite time vectors, the time t of CPA can occur after one of the vector durations. In this case, the shortest duration may be used to find the time of CPA. Otherwise, the time t may be used to define the time of the CPA.

The positions of the Ownship and the Intruder are extrapolated to the CPA, and the distance between the Ownship and the Intruder is calculated at the CPA. This calculated distance is the closest distance that is expected to occur between the Ownship and the Intruder. If the calculated distance is less than a desired separation distance S, a LOS is predicted to occur.

When computing the CPA for a series of vectors (e.g., vectors corresponding to the phases of the speed maneuver described with reference to FIG. 11), a CPA may be identified for each of the vectors and the minimum distance between all vectors may be taken as the CPA for the series of vectors. A search time frame may be used to implement the calculations. For example, searches be performed using different time frames, each search may perform calculations from the search frame's start time to the search frame's end time.

An avoidance maneuvering system, such as the AMS 128 of FIG. 1, may use a decomposition that breaks apart a multiple variable constrained optimization problem into a series of single variable problems. The problem may be modeled as a standard zero/root-finding problem and a false position method may be used to solve the sub-problems. As explained above, the false position method converges if the problem is bounded. The problem decomposition described herein creates bounds for the searches. In this context, "bounded" means, for a single variable function f(x) and two initial values for x, x0 and x1, that f(x0) and f(x1) are of opposite polarity (that is, f(x) has a zero value between f(x0) and f(x1)). The function f(x) in the process described above is the minimum CPA distance minus the desired miss distance S. This function is zero when the minimum CPA distance and the desired miss distance are equal, is positive when there is extra separation (i.e., when the minimum CPA distance is greater than the desired miss distance), and is negative when there is a LOS (i.e., when the minimum CPA distance is less than the desired miss distance).

Figure 13:
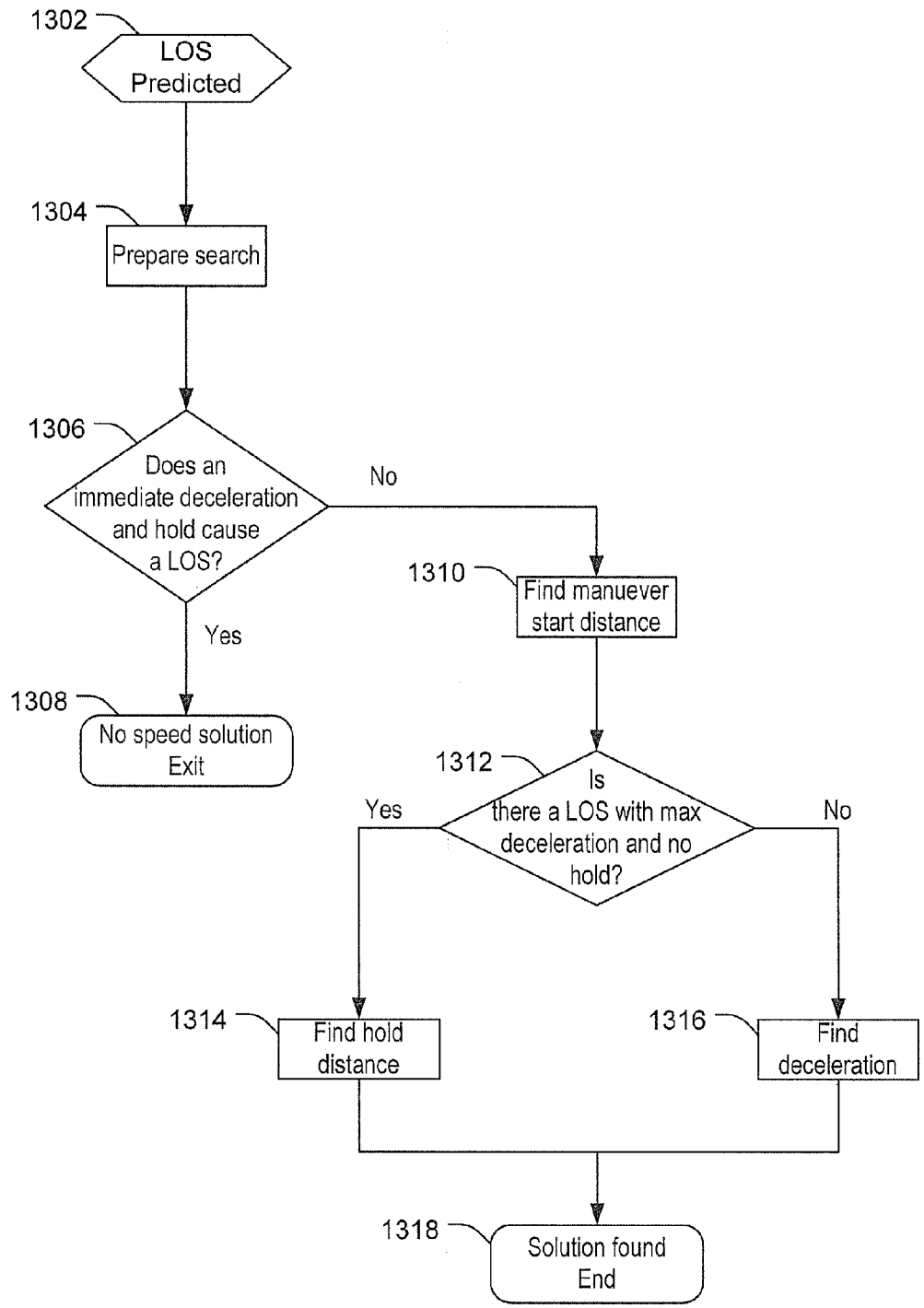
FIG. 13 is flow chart of a particular embodiment of a speed avoidance maneuver solving method.

FIG. 13 is flow chart of a particular embodiment of a speed avoidance maneuver solving method. In FIG. 13, false position searches are conducted at 1310, 1314 and 1316. When a closest point of approach (CPA) that is less than a separation distance S is identified, a LOS is predicted, at 1302. At 1304, a search is prepared. Preparation for the search may include setting variables as follows:

| $X_S$ | $X_P$ | $X_H$ |
|---|---|---|
| Min | Max | Max |

That is, the initial search may be prepared based on a maneuver that starts immediately (i.e., minimum start distance $X_S$), uses the maximum deceleration (i.e., the maximum percent speed reduction $X_P$), and uses the maximum hold (i.e., the maximum hold distance $X_H$). The maximum and minimum values of each variable may be predetermined, for example, based on a mission specification, based on characteristics of the Ownship, or based on other criteria.

It is possible that no speed solution exists. For example, when the conflict is too imminent, when the deceleration or minimum speed parameters are not sufficient to allow avoiding the LOS, or when the Intruder is stationary or oncoming. At 1306, a determination of whether a speed solution exists may be made. For example, the determination may evaluate whether an immediate maximum deceleration and maximum hold avoids the LOS. If the immediate maximum deceleration and maximum hold does not avoid the LOS, the method exits at 1308 since no speed solution exists. When no speed solution exists, another maneuver may be determined to avoid the LOS. For example, the lateral avoidance maneuver solving method described with reference to FIGS. 2-10 may be used to determine a lateral maneuver to avoid the LOS. Alternately, or in addition, a TCAS may be used to determine an altitude change to avoid the LOS.

At 1310, a first search may be performed to find the maneuver start distance $X_S$. The maximum deceleration (i.e., the maximum percent speed reduction $X_P$) and the maximum hold (i.e., the maximum hold distance $X_H$) may be used to find the maneuver start distance $X_S$. Using the maximum deceleration and the maximum hold may maximize the time until the maneuver is to be executed. With the maximum deceleration and the maximum hold, there is no LOS (as determined at 1306), so the start distance $X_S$ can be advanced until a LOS is identified. The false position search finds a value of the start distance $X_S$ that is most advanced (i.e., furthest in the future) that does not cause a LOS. The search frame may start at the current time and may end at the end of the configurable search frame.

At 1312, a determination is made whether there is a LOS using the maximum deceleration and a minimum hold (e.g., no hold). When the maximum deceleration and minimum hold causes a LOS, then the hold may need to be extended. Accordingly, the method may proceed to 1314 to perform a search to find the hold distance that avoids the LOS (using the maximum deceleration). When the maximum deceleration and minimum hold does not cause a LOS, then the deceleration may be reduced to avoid unnecessary delays. Accordingly, the method may proceed to 1316 to perform a search to find the deceleration that avoids the LOS (using the minimum hold). The process then ends successfully at 1318.

In a particular embodiment, the searches at 1310, 1314, and 1316 may be performed using the false-position search method of FIG. 7 using minimum values and maximum values for the speed maneuver, as explained above. For example, the input variables val_max and val_min may be selected to correspond to speed maneuver related values. To illustrate, performing a search for the deceleration may include setting the val_max input variable to the maximum deceleration and setting the val_min input variable to the minimum deceleration (e.g., zero).

Figure 14:
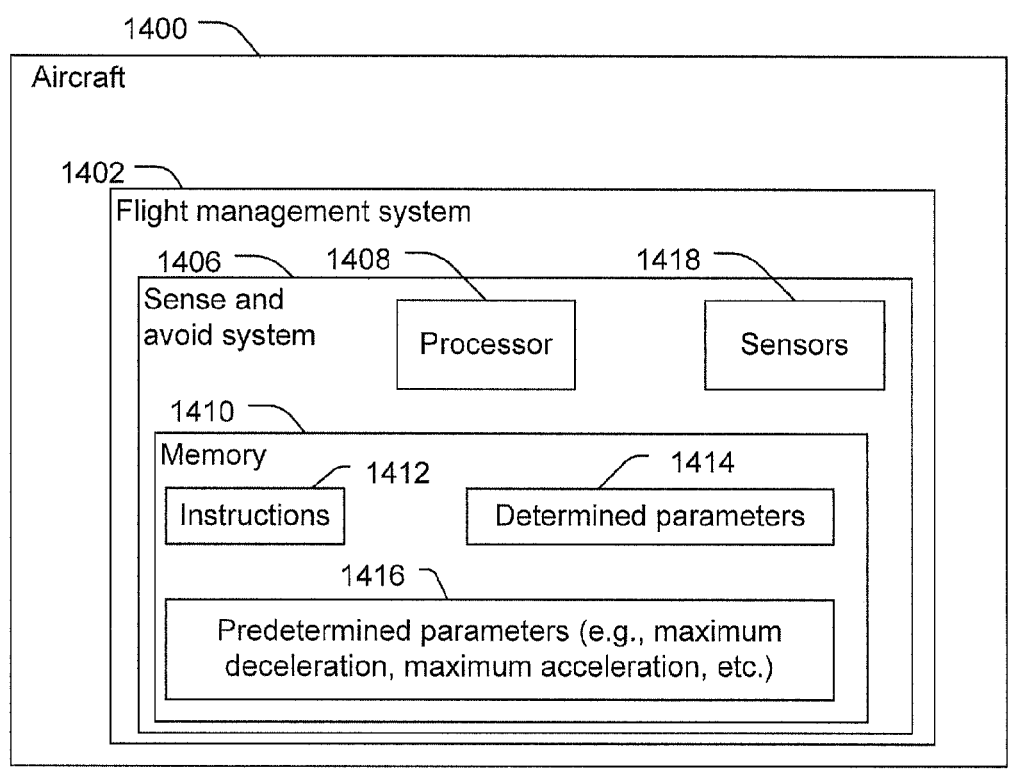
FIG. 14 is a block diagram of an aircraft that includes a sense and avoid system.

FIG. 14 is a block diagram of a particular embodiment of an aircraft 1400. The aircraft 1400 may be the aircraft 100 of FIGS. 1, 2, 4, 6 and 10. The aircraft 1400 may include a flight management system 1402, such as the FMS 102 of FIG. 1. The flight management system 1402 may include a sense and avoid system 1406. For example, the sense and avoid system 1406 may be or may include an avoidance maneuvering system (AMS), such as the AMS 128 of FIG. 1. The sense and avoid system 1406 may be adapted to identify a potential loss of separation (LOS) and to determine a maneuver to avoid the LOS. The maneuver may be an altitude change maneuver, a lateral maneuver or a speed maneuver. In a particular embodiment, the sense and avoid system 1406 is adapted to determine more than one maneuver to avoid the LOS and then to select a particular maneuver to implement based on selection criteria. For example, the sense and avoid system 1406 may determine a lateral maneuver and a speed maneuver to avoid the LOS. The sense and avoid system 1406 may then select to implement either the lateral maneuver or the speed maneuver based on predetermined preferences (e.g., a predetermined preference to perform a lateral maneuver when a lateral maneuver is identified or a predetermined preference to perform a speed maneuver when a speed maneuver is identified), based on which maneuver is most efficient (e.g., uses least fuel, has less effect on a mission, etc.), based on other selection criteria, or any combination thereof.

In a particular embodiment, the sense and avoid system 1406 is adapted to attempt to determine particular types of maneuvers in a predetermined order. For example, when a potential LOS is identified, the sense and avoid system 1406 may attempt to determine a first type of maneuver (e.g., a lateral maneuver, a speed maneuver or an altitude change) to avoid the LOS. If a maneuver of the first type that avoids the LOS is identified, the maneuver may be executed. However, if no maneuver of the first type that avoids the LOS is identified, the sense and avoid system 1406 may attempt to determine a maneuver of a second type to avoid the LOS. Similarly, if no maneuver of the second type that avoids the LOS is identified, the sense and avoid system 1406 may attempt to find a maneuver of the third type that avoids the LOS.

The sense and avoid system 1406 may include a processor 1408 and a memory 1410 accessible to the processor 1408. The memory 1410 may include instructions 1412 that are executable by the processor 1408 to identify a potential loss of separation (LOS) between the aircraft 1400 and a second aircraft. The potential LOS may be identified by projecting or extrapolating a flight vector of the aircraft 1400 and the second aircraft. For example, the processor 1408 may analyze data from sensors 1418 to determine a position, a course and a speed of the aircraft 1400 and a position, a course and a speed of the second aircraft. By extrapolating the position, the course and the speed of the two aircrafts, the processor 1408 may determine whether the two aircraft will, at a future time, be closer than a desired separation distance.

The instructions 1412 may also be executable by the processor 1408 to determine a maneuver (e.g., a speed maneuver, a lateral maneuver or an altitude change) to avoid the LOS. For example, the instructions 1412 may be executed by the processor 1408 to determine whether executing a first speed maneuver using predetermined parameters 1416 will avoid the potential LOS. For example, the predetermined parameters 1416 may include no delay (i.e., immediate execution of the maneuver), a maximum deceleration, and a minimum hold duration. When the first speed maneuver will not avoid the potential LOS, the instructions 1412 may be executable by the processor 1408 to determine one or more turns at a current altitude to avoid the potential LOS. Alternately, or in addition, when the first speed maneuver will not avoid the potential LOS, the instructions 1412 may be executable by the processor 1408 to determine a change in altitude to avoid the potential LOS.

When the first speed maneuver will avoid the potential LOS, the instructions 1412 may be executable by the processor 1408 to determine parameters 1414 of a second speed maneuver. Determining the parameters 1414 of the second speed maneuver may include determining a maneuver start location. The maneuver start location may be determined as a most distance point from a current location of the aircraft 1400 at which the LOS can be avoided using a speed maneuver including the maximum deceleration and a maximum hold time.

Determining the parameters 1414 of the second speed maneuver may include determining whether executing a no-hold deceleration maneuver beginning at the maneuver start location avoids the potential LOS. The no-hold deceleration maneuver may include a predetermined deceleration (e.g., the maximum deceleration) followed promptly by a predetermined acceleration (e.g., a maximum acceleration). Determining the parameters 1414 of the second speed maneuver may include determining a hold time of the second speed maneuver. For example, the second speed maneuver may include a hold time that is greater than the minimum hold time. Determining the parameters 1414 of the second speed maneuver may include determining a deceleration of the second speed maneuver. For example, the second speed maneuver may include a deceleration that is less than the maximum deceleration. To illustrate, determining the parameters of the second speed maneuver may include determining a minimum deceleration that avoids the potential LOS when a no-hold deceleration maneuver avoids the potential LOS.

In a particular embodiment, the flight control system 1402 may send control signals to other components of the aircraft 1400 to execute the second speed maneuver.

Figure 15:
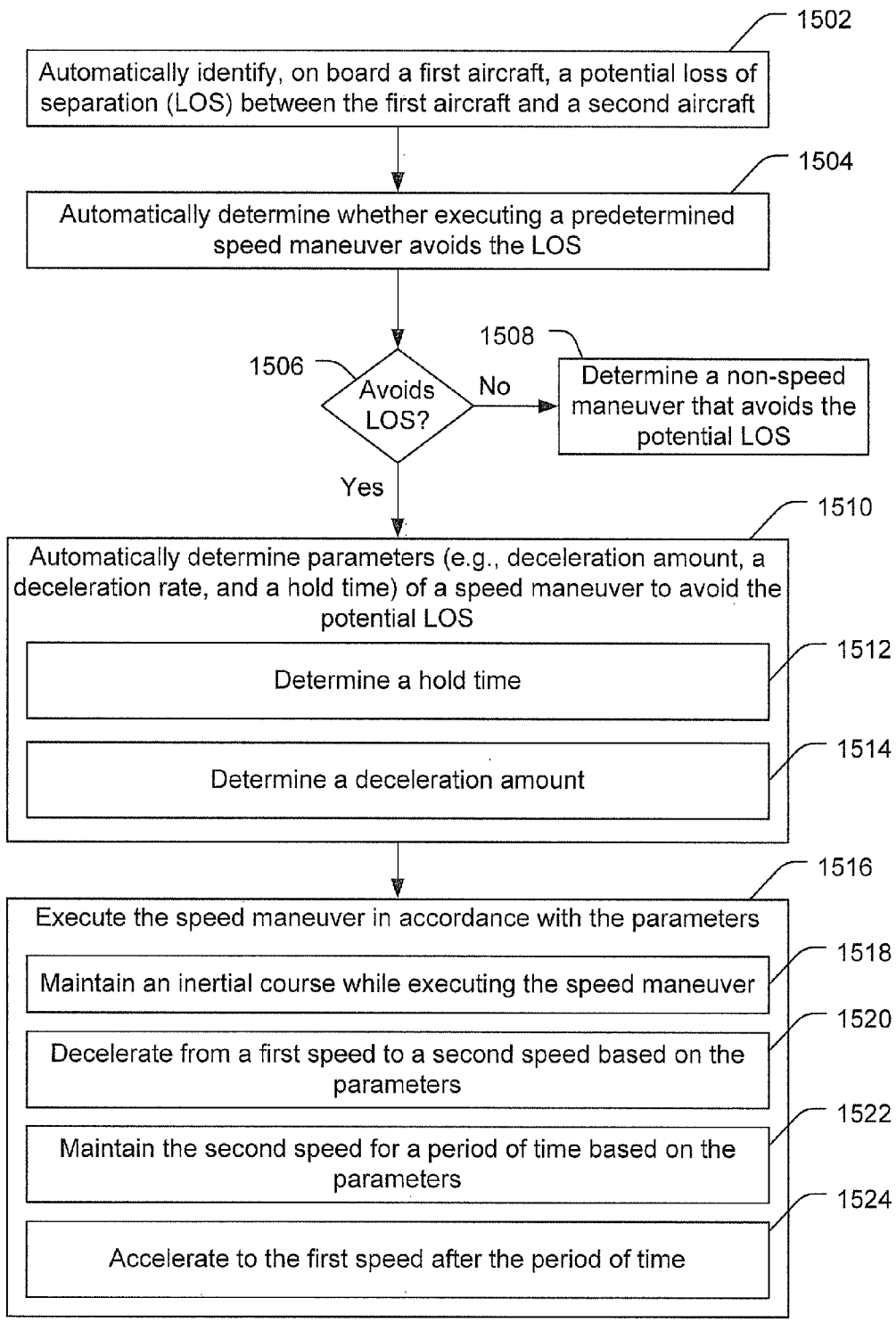
FIG. 15 is flow chart of a particular embodiment of a method of performing a speed avoidance maneuver.

FIG. 15 is flow chart of a particular embodiment of a method of performing a speed avoidance maneuver. The method includes automatically (e.g., without human intervention) identifying, on board a first aircraft, a potential loss of separation (LOS) between the first aircraft and a second aircraft, at 1502. For example, the first aircraft may include the aircraft 100 of FIGS. 1, 2, 4, 6 and 10 or the aircraft 1400 of FIG. 14.

The method may include automatically determining whether executing a predetermined speed maneuver avoids the LOS, at 1504. When the predetermined speed maneuver does not avoid the potential LOS, at 1506, a non-speed maneuver that avoids the potential LOS may be determined, at 1508.

When the predetermined speed maneuver avoids the potential LOS, at 1506, parameters of another speed maneuver (e.g., a speed maneuver other than the predetermined speed maneuver) to avoid the potential LOS may be automatically determined, at 1510. The parameters of the speed maneuver may include at least one of a deceleration amount, a deceleration rate, and a hold time. For example, determining the parameters of the speed maneuver may include determining a hold time, at 1512. In another example, determining the parameters of the speed maneuver may include determining a deceleration amount, at 1514.

The method may also include executing the speed maneuver in accordance with the parameters, at 1516. An inertial course of the aircraft may be maintained while the speed maneuver is executed, at 1518. Executing the speed maneuver may include decelerating from a first speed to a second speed based on the parameters, at 1520, maintaining the second speed for a period of time based on the parameters, at 1522, and accelerating to the first speed after the period of time, at 1524.

Accordingly, systems and methods disclosed herein may provide loss of separation avoidance capability on-board an aircraft. For example, a control system, such as a sense and avoid system, may be integrated into the aircraft. The control system may identify a potential loss of separation condition and may perform maneuvers to avoid the loss of separation. The control system may perform an initial test using predetermined parameters to determine whether a maneuver of a particular type can be performed to avoid the potential loss of separation. After determining that a maneuver of the particular type may be able to avoid the loss of separation, the control system may attempt to find a less severe maneuver of the particular type that also avoids the loss of separation. Such control systems may enable unmanned aerial vehicles to fly in national airspace without violating flight safety rules regarding loss of separation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A flight management system for an aircraft, the flight management system comprising:
   a processor; and
   a memory accessible to the processor, the memory storing instructions that are executable by the processor to:
      identify a potential loss of separation (LOS) between the aircraft and a second aircraft;
      determine whether the potential LOS is avoidable using a first speed maneuver wherein the first speed maneuver is based on a maximum deceleration of the aircraft;
      and in response to determining that the first speed maneuver would avoid the potential LOS, iteratively determine one or more parameters of a second speed maneuver to avoid the potential LOS.

2. The flight management system of claim 1, wherein the instructions are further executable by the processor to send control signals to a flight control system to execute a maneuver subsequent to determining whether the potential LOS is avoidable using the first speed maneuver.

3. The flight management system of claim 1, wherein the instructions are further executable by the processor to determine a turn maneuver to avoid the potential LOS when the potential LOS is not avoidable using the first speed maneuver.

4. The flight management system of claim 1, wherein the instructions are further executable by the processor to determine a change in altitude to avoid the potential LOS when the potential LOS is not avoidable using the first speed maneuver.

5. The flight management system of claim 1, wherein the potential LOS is identified by extrapolating data indicating a first flight vector corresponding to the aircraft and a second flight vector corresponding to the second aircraft.

6. The flight management system of claim 1, wherein the second speed maneuver is based at least in part on a minimum amount of time to maintain a particular speed.

7. The flight management system of claim 1, wherein iteratively determining the one or more parameters of the second speed maneuver includes determining a no-hold deceleration maneuver, wherein the no-hold deceleration maneuver includes performing a deceleration maneuver followed immediately by an acceleration maneuver.

8. The flight management system of claim 7, wherein at least one of the one or more parameters of the second speed maneuver corresponds to a minimum deceleration amount that causes the potential LOS to be avoided when the potential LOS is avoidable by performing the no-hold deceleration maneuver.

9. The flight management system of claim 7, wherein at least one of the one or more parameters of the second speed maneuver corresponds to a minimum amount of time to maintain a decelerated speed that causes the potential LOS to be avoided when the potential LOS is not avoidable by performing the no-hold deceleration maneuver.

10. A method comprising:
at a flight management system of a first aircraft:
automatically identifying, a potential loss of separation (LOS) between the first aircraft and a second aircraft;
determining whether the potential LOS is avoidable using a first speed maneuver wherein the first speed maneuver is based on a maximum deceleration of the first aircraft; in response to determining that the first speed maneuver would avoid the potential LOS, iteratively determining one or more parameters of a second speed maneuver to avoid the potential LOS; and
executing a particular maneuver subsequent to determining whether the potential LOS is avoidable using the first speed maneuver.

11. The method of claim 10, wherein the one or more parameters include at least one of a deceleration amount or an amount of time to maintain a decelerated speed.

12. The method of claim 10, wherein the one or more parameters of the second speed maneuver are set to predetermined values before the potential LOS is automatically identified.

13. The method of claim 10, further comprising, when the potential LOS is not avoidable using the first speed maneuver, determining whether the potential LOS is avoidable using a non-speed maneuver.

14. The method of claim 10, wherein iteratively determining the one or more parameters of the second speed maneuver includes determining an amount of time to maintain one of a decelerated speed or an accelerated speed.

15. The method of claim 14, wherein iteratively determining the one or more parameters of the second speed maneuver includes determining one of a deceleration amount or an acceleration amount.

16. The method of claim 10, wherein the particular maneuver is the second speed maneuver, wherein the second speed maneuver includes decelerating from a first speed to a second speed based on at least one of the one or more parameters, maintaining the second speed for a period of time based on at least one of the one or more parameters, and accelerating to the first speed after the period of time.

17. The method of claim 10, wherein executing the particular maneuver includes maintaining an inertial course while executing the second speed maneuver.

18. An aircraft comprising:
a processor; and
a memory accessible to the processor, the memory storing instructions that are executable by the processor to:
cause the aircraft to perform a maneuver in response to a potential loss of separation (LOS) between the aircraft and a second aircraft by:
determining whether the potential LOS is avoidable using a first speed maneuver wherein the first speed maneuver is based on a maximum deceleration of the aircraft; in response to determining that the first speed maneuver would avoid the potential LOS, iteratively determining one or more parameters of a second speed maneuver to avoid the potential LOS; and
executing a particular maneuver subsequent to determining whether the potential LOS is avoidable using the first speed maneuver.

* * * * *